(12) United States Patent
Murphy et al.

(10) Patent No.: US 10,180,248 B2
(45) Date of Patent: Jan. 15, 2019

(54) LED LAMP WITH SENSING CAPABILITIES

(71) Applicant: ProPhotonix Limited, Salem, NH (US)

(72) Inventors: Karol Murphy, Cork (IE); Peter Panek, Doulgas (IE)

(73) Assignee: ProPhotonix Limited, Salem, NH (US)

( * ) Notice: Subject to any disclaimer, the term of this patent is extended or adjusted under 35 U.S.C. 154(b) by 0 days.

(21) Appl. No.: 15/254,801

(22) Filed: Sep. 1, 2016

(65) Prior Publication Data

US 2017/0059400 A1    Mar. 2, 2017

Related U.S. Application Data

(60) Provisional application No. 62/213,443, filed on Sep. 2, 2015.

(51) Int. Cl.
| | |
|---|---|
| *F21V 29/70* | (2015.01) |
| *F21V 17/10* | (2006.01) |
| *F21V 23/00* | (2015.01) |
| *F21V 8/00* | (2006.01) |
| *G01J 1/04* | (2006.01) |
| *F21Y 115/10* | (2016.01) |
| *F21Y 113/13* | (2016.01) |
| *G01J 1/42* | (2006.01) |

(52) U.S. Cl.
CPC ............ *F21V 29/70* (2015.01); *F21V 17/101* (2013.01); *F21V 17/107* (2013.01); *F21V 23/005* (2013.01); *G01J 1/0407* (2013.01); *G01J 1/0422* (2013.01); *G02B 6/0096* (2013.01); *F21Y 2113/13* (2016.08); *F21Y 2115/10* (2016.08); *G01J 2001/4252* (2013.01)

(58) Field of Classification Search
CPC ...... F21V 29/70; F21V 17/101; F21V 17/107; F21V 23/005; G01J 1/0422; G01J 1/0407; G01J 2001/425; G02B 6/0096; F21Y 2115/10; F21Y 2113/13
See application file for complete search history.

(56) References Cited

U.S. PATENT DOCUMENTS

| | | |
|---|---|---|
| 2,450,330 A | 9/1948 | Giers |
| 3,947,131 A | 3/1976 | Karl |
| 4,798,956 A | 1/1989 | Hochstein |
| 4,867,561 A | 9/1989 | Fujii et al. |
| 5,714,802 A * | 2/1998 | Cloud ................. H01L 25/0657 257/723 |
| 5,724,140 A | 3/1998 | Haywood |
| 6,022,124 A | 2/2000 | Bourn et al. |
| 6,220,723 B1 | 4/2001 | Freeman et al. |
| 6,299,338 B1 | 10/2001 | Levinson et al. |
| 6,301,380 B1 | 10/2001 | Mullins et al. |
| 6,348,176 B1 | 2/2002 | Hammer et al. |

(Continued)

FOREIGN PATENT DOCUMENTS

| | | |
|---|---|---|
| EP | 0902275 A1 | 3/1999 |
| EP | 1074275 A1 | 2/2001 |

(Continued)

*Primary Examiner* — Tracie Y Green
(74) *Attorney, Agent, or Firm* — Pandiscio & Pandiscio

(57) ABSTRACT

A novel LED lamp comprising: a lamp body; an LED mounted to the lamp body; an outer (exit) window; and a hinged clamp for releasably mounting the outer (exit) window to the lamp body such that light emitted from the LED passes through the outer (exit) window.

11 Claims, 12 Drawing Sheets

(56) References Cited

U.S. PATENT DOCUMENTS

| | | |
|---|---|---|
| 6,419,821 B1 | 7/2002 | Gadgil et al. |
| 6,457,823 B1 | 10/2002 | Cleary et al. |
| 6,462,947 B1 | 10/2002 | Huang |
| 6,531,095 B2 | 3/2003 | Hammer et al. |
| 6,554,444 B2 | 4/2003 | Shimada et al. |
| 6,561,640 B1 | 5/2003 | Young |
| 6,579,495 B1 | 6/2003 | Maiden |
| 6,603,126 B2 | 8/2003 | Yamada et al. |
| 6,661,580 B1 | 12/2003 | Solarz |
| 6,686,876 B1 | 2/2004 | Patel |
| 6,695,614 B2 | 2/2004 | Plank |
| 6,710,363 B1 | 3/2004 | Trigiani |
| 6,733,150 B1 | 5/2004 | Hanley |
| 6,734,953 B2 | 5/2004 | Numata |
| 6,752,627 B2 | 6/2004 | Lin |
| 6,764,501 B2 | 7/2004 | Ganz |
| 6,771,357 B1 | 8/2004 | Inukai |
| 6,777,244 B2 | 8/2004 | Pepper et al. |
| 6,787,782 B1 | 9/2004 | Krosney et al. |
| 6,791,676 B1 | 9/2004 | Meller |
| 6,797,044 B2 | 9/2004 | Ou et al. |
| 6,809,792 B1 | 10/2004 | Tehranchi et al. |
| 6,828,576 B2 | 12/2004 | Spivak |
| 6,835,202 B2 | 12/2004 | Harth et al. |
| 6,835,679 B2 | 12/2004 | Bilanin et al. |
| 6,846,074 B2 | 1/2005 | Hirai |
| 6,849,308 B1 | 2/2005 | Speakman et al. |
| 6,854,859 B2 | 2/2005 | Cooper et al. |
| 6,855,944 B2 | 2/2005 | Trigiani |
| 6,871,986 B2 | 3/2005 | Yamanaka et al. |
| 6,880,954 B2 | 4/2005 | Ollett et al. |
| 6,890,346 B2 | 5/2005 | Ganz et al. |
| 6,903,809 B2 | 6/2005 | Donahue et al. |
| 6,918,482 B2 | 7/2005 | Thierauf |
| 6,926,201 B2 | 8/2005 | Numata |
| 6,942,362 B1 | 9/2005 | Deutsch et al. |
| 6,947,138 B2 | 9/2005 | Arno |
| 6,949,228 B2 | 9/2005 | Ou et al. |
| 6,953,341 B2 | 10/2005 | Black |
| 6,969,178 B2 | 11/2005 | Zuloff |
| 6,980,434 B2 | 12/2005 | Ou et al. |
| 6,983,066 B2 | 1/2006 | Mahon et al. |
| 6,989,023 B2 | 1/2006 | Black |
| 6,998,650 B1 | 2/2006 | Wu |
| 7,001,051 B2 | 2/2006 | Palmer et al. |
| 7,005,662 B2 | 2/2006 | Caron et al. |
| 7,021,807 B2 | 4/2006 | Chew |
| 7,042,172 B2 | 5/2006 | Dowling et al. |
| 7,080,900 B2 | 7/2006 | Takabayashi et al. |
| 7,080,920 B2 | 7/2006 | Fitzsimmons et al. |
| 7,081,128 B2 | 7/2006 | Hart et al. |
| 7,083,252 B2 | 8/2006 | Yokoyama et al. |
| 7,084,389 B2 | 8/2006 | Spector |
| 7,102,742 B2 | 9/2006 | Geurts |
| 7,107,996 B2 | 9/2006 | Ganz et al. |
| 7,115,879 B2 | 10/2006 | Leach et al. |
| 7,116,421 B2 | 10/2006 | Garcia et al. |
| 7,122,812 B2 | 10/2006 | Kalley et al. |
| 7,125,526 B2 | 10/2006 | Sheehan |
| 7,137,695 B2 | 11/2006 | Yokoyama |
| 7,137,696 B2 | 11/2006 | Siegel |
| 7,141,811 B2 | 11/2006 | Trigiani |
| 7,144,247 B2 | 12/2006 | Black |
| 7,151,264 B2 | 12/2006 | Ehlers, Sr. |
| 7,157,840 B2 | 1/2007 | Fujishima et al. |
| 7,159,590 B2 | 1/2007 | Rife |
| 7,170,606 B2 | 1/2007 | Yerazunis |
| 7,173,266 B2 | 2/2007 | Katsuki |
| 7,175,712 B2 | 2/2007 | Siegel |
| 7,189,983 B2 | 3/2007 | Aguirre et al. |
| 7,202,490 B2 | 4/2007 | Aguirre et al. |
| 7,207,682 B2 | 4/2007 | Stephens |
| 7,210,817 B2 | 5/2007 | Lee et al. |
| 7,211,299 B2 | 5/2007 | Siegel |
| 7,222,953 B2 | 5/2007 | Yokoyama |
| 7,226,470 B2 | 6/2007 | Kemeny et al. |
| 7,229,467 B2 | 6/2007 | Spivak |
| 7,232,212 B2 | 6/2007 | Iwase |
| 7,235,791 B2 | 6/2007 | Watanabe et al. |
| 7,238,328 B2 | 7/2007 | Buhr |
| 7,245,367 B2 | 7/2007 | Miller et al. |
| 7,249,836 B2 | 7/2007 | Yokoyama |
| 7,250,611 B2 | 7/2007 | Aguirre et al. |
| 7,252,678 B2 | 8/2007 | Ostler et al. |
| 7,259,853 B2 | 8/2007 | Hubble, III et al. |
| 7,261,408 B2 | 8/2007 | Otter |
| 7,262,835 B2 | 8/2007 | Geurts |
| 7,264,346 B2 | 9/2007 | Nishino et al. |
| 7,267,457 B2 | 9/2007 | Ostler et al. |
| 7,271,398 B2 | 9/2007 | Androsyuk et al. |
| 7,276,127 B2 | 10/2007 | Dube et al. |
| 7,276,854 B1 | 10/2007 | Deutsch et al. |
| 7,291,852 B1 | 11/2007 | Matlack et al. |
| 7,293,889 B2 | 11/2007 | Kamiya et al. |
| 7,300,192 B1 | 11/2007 | Mueller et al. |
| 7,300,499 B1 | 11/2007 | Fleisher |
| 7,311,723 B2 | 12/2007 | Seibel et al. |
| 7,321,109 B2 | 1/2008 | Shur et al. |
| 7,328,708 B2 | 2/2008 | Malak |
| 7,331,784 B2 | 2/2008 | Suzuki |
| 7,346,411 B2 | 3/2008 | Silva et al. |
| 7,348,581 B2 | 3/2008 | March et al. |
| 7,350,972 B2 | 4/2008 | Seebacher et al. |
| 7,355,155 B2 | 4/2008 | Wang |
| 7,368,694 B2 | 5/2008 | Goulas et al. |
| 7,370,955 B2 | 5/2008 | Yokoyama et al. |
| 7,372,039 B2 | 5/2008 | Tokhtuev et al. |
| 7,390,462 B2 | 6/2008 | Rao et al. |
| 7,393,095 B2 | 7/2008 | Oshima et al. |
| 7,396,103 B2 | 7/2008 | Nishino |
| 7,396,143 B2 | 7/2008 | Sloan |
| 7,399,982 B2 | 7/2008 | Siegel |
| 7,427,317 B2 | 9/2008 | Sloan |
| 7,430,355 B2 | 9/2008 | Heikenfeld et al. |
| 7,431,759 B2 | 10/2008 | Sloan |
| 7,465,909 B2 | 12/2008 | Siegel |
| 7,470,502 B2 | 12/2008 | Tsuchimura |
| 7,476,888 B2 | 1/2009 | Fiset |
| 7,478,757 B2 | 1/2009 | Vasic et al. |
| 7,488,065 B2 | 2/2009 | Yokoyama |
| 7,488,102 B2 | 2/2009 | Brukilacchio |
| 7,498,009 B2 | 3/2009 | Leach et al. |
| 7,498,065 B2 | 3/2009 | Siegel |
| 7,499,154 B2 | 3/2009 | Stock et al. |
| 7,501,659 B2 | 3/2009 | Kanno et al. |
| 7,507,973 B2 | 3/2009 | Bircher |
| 7,513,906 B2 | 4/2009 | Passy et al. |
| 7,514,696 B2 | 4/2009 | Spector |
| 7,515,251 B2 | 4/2009 | Geurts |
| 7,520,978 B2 | 4/2009 | Harbers |
| 7,544,291 B2 | 6/2009 | Ehlers, Sr. |
| 7,553,456 B2 | 6/2009 | Gaska et al. |
| 7,563,615 B2 | 7/2009 | Ponce |
| 7,584,890 B2 | 9/2009 | Mazowiesky et al. |
| 7,609,370 B2 | 10/2009 | Voigt et al. |
| 7,626,187 B2 | 12/2009 | Younts |
| 7,629,556 B2 | 12/2009 | Rastegar |
| 7,634,104 B2 | 12/2009 | Alasia et al. |
| 7,652,267 B2 | 1/2010 | Tokhtuev et al. |
| 7,658,604 B1 | 2/2010 | Yang et al. |
| 7,667,836 B2 | 2/2010 | Sones et al. |
| 7,671,346 B2 | 3/2010 | Siegel |
| 7,683,104 B2 | 3/2010 | Watanabe |
| 7,690,782 B2 | 4/2010 | Odell |
| 7,705,325 B2 | 4/2010 | Vestal |
| 7,709,550 B2 | 5/2010 | Aoai |
| 7,712,914 B2 | 5/2010 | Levy et al. |
| 7,715,613 B2 | 5/2010 | Dobbs |
| 7,722,816 B2 | 5/2010 | Jiang et al. |
| 7,728,050 B2 | 6/2010 | Watanabe |
| 7,729,509 B2 | 6/2010 | Alasia et al. |
| 7,741,608 B2 | 6/2010 | Takabatake |
| 7,745,169 B2 | 6/2010 | Eden et al. |
| 7,745,789 B2 | 6/2010 | Abrahamsson et al. |

(56) References Cited

U.S. PATENT DOCUMENTS

| | | |
|---|---|---|
| 7,748,347 B2 | 7/2010 | Richmond |
| 7,751,170 B2 | 7/2010 | Sun et al. |
| 7,753,514 B2 | 7/2010 | Nakano et al. |
| 7,758,179 B2 | 7/2010 | Niekawa |
| 7,759,651 B2 | 7/2010 | Knight et al. |
| 7,771,021 B2 | 8/2010 | Kim et al. |
| 7,781,236 B2 | 8/2010 | Suzuki et al. |
| 7,781,751 B2 | 8/2010 | Gardner, III |
| 7,794,074 B2 | 9/2010 | Vosahlo et al. |
| 7,794,075 B2 | 9/2010 | Nakano et al. |
| 7,794,076 B2 | 9/2010 | Nakano et al. |
| 7,798,630 B2 | 9/2010 | Nakazawa |
| 7,804,074 B2 | 9/2010 | Bernecker |
| 7,810,954 B2 | 10/2010 | Kolodin |
| 7,823,586 B2 | 11/2010 | Glazman |
| 7,824,480 B2 | 11/2010 | Hudebaus et al. |
| 7,840,380 B2 | 11/2010 | Bernhardt |
| 7,842,351 B2 | 11/2010 | Watanabe |
| 7,842,932 B2 | 11/2010 | Knight et al. |
| 7,845,823 B2 | 12/2010 | Mueller et al. |
| 7,884,341 B2 | 2/2011 | Boe |
| 7,891,852 B2 | 2/2011 | Pugh et al. |
| 7,892,386 B2 | 2/2011 | Platzer et al. |
| 7,897,104 B2 | 3/2011 | Kwon |
| 7,901,442 B2 | 3/2011 | Juestel et al. |
| 7,906,766 B2 | 3/2011 | Cox |
| 7,921,853 B2 | 4/2011 | Fiset |
| 7,921,859 B2 | 4/2011 | Rastegar et al. |
| 7,948,617 B2 | 5/2011 | Shubinsky et al. |
| 7,948,628 B2 | 5/2011 | Laluvein et al. |
| 7,948,665 B2 | 5/2011 | Hatzav et al. |
| 7,954,430 B2 | 6/2011 | Chretien et al. |
| 7,960,706 B2 | 6/2011 | Ullman |
| 7,976,150 B2 | 7/2011 | Ueno |
| 7,988,259 B2 | 8/2011 | Hishida et al. |
| 7,988,334 B2 | 8/2011 | Cheng et al. |
| 7,989,780 B2 | 8/2011 | Tokhtuev et al. |
| 8,011,299 B2 | 9/2011 | Vosahlo |
| 8,016,465 B2 | 9/2011 | Egerer et al. |
| 8,025,386 B2 | 9/2011 | Yokoyama |
| 8,029,278 B1 | 10/2011 | Levine |
| 8,038,063 B2 | 10/2011 | Lee |
| 8,038,282 B2 | 10/2011 | Claeys |
| 8,038,427 B2 | 10/2011 | Kritchman et al. |
| 8,041,197 B2 | 10/2011 | Kasai et al. |
| 8,042,929 B2 | 10/2011 | Yokoyama |
| 8,048,391 B2 | 11/2011 | Molins |
| 8,066,416 B2 | 11/2011 | Bucher |
| 8,068,661 B2 | 11/2011 | Onushkin et al. |
| 8,077,316 B2 | 12/2011 | Materer et al. |
| 8,079,729 B2 | 12/2011 | Van De Ven et al. |
| 8,084,756 B2 | 12/2011 | Tokhtuev et al. |
| 8,109,981 B2 | 2/2012 | Gertner et al. |
| 8,110,074 B1 | 2/2012 | Neckers |
| 8,113,687 B2 | 2/2012 | Villard et al. |
| 8,115,924 B2 | 2/2012 | Imura |
| 8,128,672 B2 | 3/2012 | Quisenberry et al. |
| 8,134,132 B2 | 3/2012 | Middlemass et al. |
| 8,136,966 B2 | 3/2012 | Hatzav et al. |
| 8,137,182 B2 | 3/2012 | Kearns et al. |
| 8,142,486 B2 | 3/2012 | Quisenberry et al. |
| 8,157,807 B2 | 4/2012 | Ferren et al. |
| 8,158,212 B2 | 4/2012 | Tojo et al. |
| 8,158,224 B2 | 4/2012 | Zhang et al. |
| 8,158,956 B2 | 4/2012 | Karunaratne et al. |
| 8,168,263 B2 | 5/2012 | Matsumura |
| 8,168,903 B2 | 5/2012 | Chen |
| 8,168,963 B2 | 5/2012 | Ratcliffe |
| 8,169,858 B2 | 5/2012 | Klopfenstein et al. |
| 8,172,570 B2 | 5/2012 | Baughman |
| 8,178,702 B2 | 5/2012 | Chauhan et al. |
| 8,179,499 B2 | 5/2012 | Lee |
| 8,181,659 B2 | 5/2012 | Shin et al. |
| 8,185,350 B2 | 5/2012 | Deriso, Jr. et al. |
| 8,193,514 B2 | 6/2012 | Ferraro et al. |
| 8,197,087 B2 | 6/2012 | Sobue et al. |
| 8,203,457 B1 | 6/2012 | Emello et al. |
| 8,203,583 B2 | 6/2012 | Wilsher |
| 8,206,426 B2 | 6/2012 | Gourgouliatos et al. |
| 8,220,391 B2 | 7/2012 | Hirokawa et al. |
| 8,226,255 B2 | 7/2012 | Fan |
| 8,237,133 B2 | 8/2012 | Ganapathisubramanian et al. |
| 8,242,466 B2 | 8/2012 | Uber |
| 8,242,475 B1 | 8/2012 | Cheng |
| 8,258,490 B2 | 9/2012 | Yamamoto et al. |
| 8,262,214 B2 | 9/2012 | Doo |
| 8,267,311 B2 | 9/2012 | Cleary et al. |
| 8,267,508 B2 | 9/2012 | Doo |
| 8,272,729 B2 | 9/2012 | Caiger et al. |
| 8,277,082 B2 | 10/2012 | Dassanayake et al. |
| 8,277,138 B2 | 10/2012 | Wakalopulos |
| 8,277,741 B2 | 10/2012 | McCabe |
| 8,286,578 B2 | 10/2012 | Leenders et al. |
| 8,287,170 B2 | 10/2012 | Hsieh |
| 8,288,739 B2 | 10/2012 | Imura |
| 8,294,389 B2 | 10/2012 | Finkle |
| 8,297,781 B2 | 10/2012 | Cheang et al. |
| 8,309,629 B2 | 11/2012 | Watanabe |
| 8,312,641 B2 | 11/2012 | Li et al. |
| 8,322,841 B2 | 12/2012 | Lang et al. |
| 8,323,749 B2 | 12/2012 | Questel et al. |
| 8,323,982 B2 | 12/2012 | LeBoeuf et al. |
| 8,324,595 B2 | 12/2012 | Takahashi et al. |
| 8,337,200 B2 | 12/2012 | Wang et al. |
| 8,342,674 B2 | 1/2013 | Araki |
| 8,342,710 B2 | 1/2013 | Rahbar-Dehghan |
| 8,350,239 B2 | 1/2013 | Roof et al. |
| 8,357,878 B2 | 1/2013 | Leonhardt et al. |
| 8,366,296 B2 | 2/2013 | Newman |
| 8,368,034 B2 | 2/2013 | Poteet et al. |
| 8,372,128 B2 | 2/2013 | Reuben |
| 8,376,583 B2 | 2/2013 | Wang et al. |
| 8,378,315 B2 | 2/2013 | Wanstrath et al. |
| 8,378,322 B2 | 2/2013 | Dahm et al. |
| 8,381,728 B2 | 2/2013 | Rao et al. |
| 8,384,047 B2 | 2/2013 | Shur et al. |
| 8,398,229 B2 | 3/2013 | Vosahlo et al. |
| 8,400,503 B2 | 3/2013 | Linnenkohl et al. |
| 8,403,527 B2 | 3/2013 | Brukilacchio |
| 8,408,689 B2 | 4/2013 | Roof et al. |
| 8,409,077 B2 | 4/2013 | Orihara et al. |
| 8,409,338 B2 | 4/2013 | Kim et al. |
| 8,420,022 B2 | 4/2013 | Soler et al. |
| 8,421,032 B2 | 4/2013 | Dornseifer |
| 8,421,043 B2 | 4/2013 | Caiger et al. |
| 8,425,065 B2 | 4/2013 | Ravillisetty et al. |
| 8,426,800 B2 | 4/2013 | Ingram et al. |
| 8,431,098 B2 | 4/2013 | Anderson |
| 8,444,304 B2 | 5/2013 | Wang |
| 8,444,918 B2 | 5/2013 | Tanaka |
| 8,445,864 B2 | 5/2013 | Thoren et al. |
| 8,458,954 B2 | 6/2013 | Yamada et al. |
| 8,466,433 B2 | 6/2013 | Ullman |
| 8,466,442 B2 | 6/2013 | Horvath et al. |
| 8,469,545 B2 | 6/2013 | Sobue et al. |
| 8,472,025 B2 | 6/2013 | Reinhard et al. |
| 8,480,246 B2 | 7/2013 | Leard |
| 8,480,722 B2 | 7/2013 | Klepper |
| 8,481,970 B2 | 7/2013 | Cooper et al. |
| 8,496,332 B2 | 7/2013 | Wang et al. |
| 8,502,168 B1 | 8/2013 | Poteet et al. |
| 8,518,094 B2 | 8/2013 | Wang |
| 8,523,924 B2 | 9/2013 | Meyer et al. |
| 8,529,831 B1 | 9/2013 | Ho et al. |
| 8,530,538 B2 | 9/2013 | Nakano et al. |
| 8,534,824 B2 | 9/2013 | Roof et al. |
| 8,535,426 B2 | 9/2013 | Sadler |
| 8,538,125 B2 | 9/2013 | Linnenkohl et al. |
| 8,540,860 B2 | 9/2013 | Cho |
| 8,550,898 B2 | 10/2013 | Kearns et al. |
| 8,556,177 B2 | 10/2013 | Hussey et al. |
| 8,556,950 B2 | 10/2013 | Rioux et al. |
| 8,557,889 B2 | 10/2013 | Matsumura |
| 8,558,200 B2 | 10/2013 | Martinez et al. |

(56) References Cited

U.S. PATENT DOCUMENTS

| | | |
|---|---|---|
| 8,563,934 B2 | 10/2013 | Yao et al. |
| 8,568,009 B2 | 10/2013 | Chiang et al. |
| 8,573,766 B2 | 11/2013 | Yang et al. |
| 8,574,276 B2 | 11/2013 | Gourgouliatos et al. |
| 8,575,567 B2 | 11/2013 | Lyslo et al. |
| 8,578,854 B2 | 11/2013 | Sievers |
| 8,579,188 B2 | 11/2013 | Cleary et al. |
| 8,581,269 B2 | 11/2013 | Kuk et al. |
| 8,590,207 B1 | 11/2013 | Shih |
| 8,591,066 B2 | 11/2013 | Garcia et al. |
| 8,596,815 B2 | 12/2013 | Lee et al. |
| 8,597,569 B2 | 12/2013 | Gruen et al. |
| 8,601,715 B2 | 12/2013 | Tweedy, Jr. et al. |
| 8,602,548 B2 | 12/2013 | Miyabayashi |
| 8,612,179 B2 | 12/2013 | Deriso, Jr. et al. |
| 8,617,300 B2 | 12/2013 | Riviere et al. |
| 8,618,511 B2 | 12/2013 | Roper et al. |
| 8,622,247 B2 | 1/2014 | Zuloff |
| 8,624,967 B2 | 1/2014 | O'Connell et al. |
| 8,627,605 B2 | 1/2014 | Drifka et al. |
| 8,642,093 B2 | 2/2014 | Hyde et al. |
| 8,644,547 B2 | 2/2014 | Hodder et al. |
| 8,646,877 B2 | 2/2014 | Thompson et al. |
| 8,653,484 B2 | 2/2014 | Rudolph et al. |
| 8,654,337 B2 | 2/2014 | Wu et al. |
| 8,654,414 B2 | 2/2014 | Han et al. |
| 8,655,128 B2 | 2/2014 | Segi et al. |
| 8,656,744 B2 | 2/2014 | Kim et al. |
| 8,662,655 B2 | 3/2014 | Furuhata et al. |
| 8,662,705 B2 | 3/2014 | Roberts et al. |
| 8,668,325 B2 | 3/2014 | Usuda et al. |
| 8,673,218 B2 | 3/2014 | Jaffe et al. |
| 8,673,994 B2 | 3/2014 | Nakano et al. |
| 8,684,511 B2 | 4/2014 | Lahut et al. |
| 8,684,515 B2 | 4/2014 | Van Dyck et al. |
| 8,696,161 B2 | 4/2014 | Pan et al. |
| 8,696,563 B2 | 4/2014 | Williams et al. |
| 8,696,998 B2 | 4/2014 | Riebel |
| 8,702,225 B2 | 4/2014 | Kachi et al. |
| 8,706,211 B2 | 4/2014 | Dacey, Jr. et al. |
| 8,723,146 B2 | 5/2014 | Dahm et al. |
| 8,727,522 B2 | 5/2014 | Maekawa et al. |
| 8,733,356 B1 | 5/2014 | Roth |
| 8,733,921 B2 | 5/2014 | Korem |
| 8,742,364 B2 | 6/2014 | Boodaghians et al. |
| 8,743,352 B2 | 6/2014 | Gong |
| 8,753,807 B2 | 6/2014 | Wieland et al. |
| 8,757,160 B2 | 6/2014 | Rao et al. |
| 8,760,295 B2 | 6/2014 | Forster |
| 8,764,153 B2 | 7/2014 | Sanada |
| 8,764,237 B2 | 7/2014 | Wang et al. |
| 8,770,806 B2 | 7/2014 | Koo et al. |
| 8,779,386 B2 | 7/2014 | Bak |
| 8,783,857 B2 | 7/2014 | Roof et al. |
| 8,785,209 B2 | 7/2014 | Sturgeon et al. |
| 8,795,600 B2 | 8/2014 | Byers et al. |
| 8,802,007 B2 | 8/2014 | Kaiga et al. |
| 8,803,109 B1 | 8/2014 | Mcpherson |
| 8,808,811 B2 | 8/2014 | Kolb et al. |
| 8,809,813 B1 | 8/2014 | Chen |
| 8,813,516 B2 | 8/2014 | Min et al. |
| 8,816,295 B2 | 8/2014 | Reichelsheimer |
| 8,816,300 B1 | 8/2014 | Walker et al. |
| 8,826,489 B2 | 9/2014 | Oh et al. |
| 8,829,458 B2 | 9/2014 | Rudolph et al. |
| 8,833,922 B2 | 9/2014 | Edwards |
| 8,840,235 B2 | 9/2014 | Blessing |
| 8,840,236 B2 | 9/2014 | Thompson |
| 8,840,845 B2 | 9/2014 | Soler et al. |
| 8,842,145 B2 | 9/2014 | Cridland et al. |
| 8,842,266 B2 | 9/2014 | Lewis et al. |
| 8,848,159 B2 | 9/2014 | Lee |
| 8,857,465 B2 | 10/2014 | Baltussen |
| 8,858,012 B2 | 10/2014 | Crabb et al. |
| 8,859,994 B2 | 10/2014 | Deal |
| 8,860,307 B2 | 10/2014 | Schmid |
| 8,869,419 B2 | 10/2014 | Karlicek, Jr. et al. |
| 8,872,137 B2 | 10/2014 | Childers |
| 8,873,062 B2 | 10/2014 | Adler et al. |
| 8,878,145 B1 | 11/2014 | Liu |
| 8,882,262 B2 | 11/2014 | Roof et al. |
| 8,882,291 B1 | 11/2014 | Bourget et al. |
| 8,888,731 B2 | 11/2014 | Dacey, Jr. et al. |
| 8,895,113 B2 | 11/2014 | Kuniyasu et al. |
| 8,895,938 B2 | 11/2014 | Ullman et al. |
| 8,896,827 B2 | 11/2014 | Chimmalgi et al. |
| 8,900,519 B2 | 12/2014 | Krosney et al. |
| 8,911,109 B2 | 12/2014 | Sobue et al. |
| 8,922,643 B2 | 12/2014 | Ji et al. |
| 8,926,915 B2 | 1/2015 | Park et al. |
| 8,928,234 B2 | 1/2015 | Kim et al. |
| 8,931,928 B2 | 1/2015 | Heintz |
| 8,932,533 B2 | 1/2015 | Kruglick |
| 8,947,111 B2 | 2/2015 | Zhu et al. |
| 8,948,863 B2 | 2/2015 | Kraft et al. |
| 8,956,156 B2 | 2/2015 | Kanno et al. |
| 8,960,190 B2 | 2/2015 | James et al. |
| 8,970,125 B2 | 3/2015 | Inui et al. |
| 8,973,284 B2 | 3/2015 | Shami et al. |
| 8,974,298 B2 | 3/2015 | Kearns et al. |
| 8,975,307 B2 | 3/2015 | Gould et al. |
| 8,993,983 B2 | 3/2015 | Li et al. |
| 8,993,988 B2 | 3/2015 | Nathan et al. |
| 8,999,237 B2 | 4/2015 | Tumanov |
| 9,001,318 B2 | 4/2015 | Schmalz |
| 9,005,530 B2 | 4/2015 | Nevin |
| 9,007,227 B2 | 4/2015 | Carralero et al. |
| 9,016,892 B1 | 4/2015 | Scribante et al. |
| 9,016,895 B2 | 4/2015 | Handsaker |
| 9,017,056 B2 | 4/2015 | Schuepbach et al. |
| 9,018,274 B2 | 4/2015 | Oyanagi et al. |
| 9,021,739 B2 | 5/2015 | Koo et al. |
| 9,022,545 B2 | 5/2015 | Kondo et al. |
| 9,028,084 B2 | 5/2015 | Maeng et al. |
| 9,028,615 B2 | 5/2015 | Eglmeier et al. |
| 9,028,641 B2 | 5/2015 | Sano et al. |
| 9,052,285 B2 | 6/2015 | Muller et al. |
| 9,056,147 B2 | 6/2015 | Ma |
| 9,056,986 B2 | 6/2015 | Kagose et al. |
| 9,060,468 B2 | 6/2015 | Klase et al. |
| 9,063,007 B2 | 6/2015 | Jaffe et al. |
| 9,067,804 B2 | 6/2015 | Jones |
| 9,078,936 B1 | 7/2015 | Denby, Jr. |
| 9,079,427 B2 | 7/2015 | Duffield |
| 9,089,119 B1 | 7/2015 | Locklar et al. |
| 9,090,114 B1 | 7/2015 | Stumm et al. |
| 9,090,787 B2 | 7/2015 | Yoda et al. |
| 9,095,704 B2 | 8/2015 | McGuire |
| 9,101,904 B2 | 8/2015 | Yates et al. |
| 9,103,970 B2 | 8/2015 | Tanimura et al. |
| 9,110,037 B2 | 8/2015 | Chimmalgi et al. |
| 9,114,184 B2 | 8/2015 | Messina et al. |
| 9,115,290 B2 | 8/2015 | Kida et al. |
| 9,128,386 B2 | 9/2015 | Chen |
| 9,144,617 B2 | 9/2015 | Deng |
| 9,150,434 B2 | 10/2015 | Basu et al. |
| 9,151,484 B1 | 10/2015 | Olsson et al. |
| 9,157,642 B2 | 10/2015 | Maeng et al. |
| 9,162,001 B2 | 10/2015 | Sunkara et al. |
| 9,164,489 B2 | 10/2015 | In |
| 9,168,321 B2 | 10/2015 | Oestergaard et al. |
| 9,169,998 B2 | 10/2015 | Heintz |
| 9,179,703 B2 | 11/2015 | Shur et al. |
| 9,186,427 B2 | 11/2015 | Drifka |
| 9,187,367 B2 | 11/2015 | Molin |
| 9,205,162 B2 | 12/2015 | Deal et al. |
| 9,205,278 B2 | 12/2015 | Gopalakrishnan et al. |
| 9,215,985 B2 | 12/2015 | Gross et al. |
| 9,235,836 B2 | 1/2016 | Auger |
| 9,239,146 B2 | 1/2016 | Walker et al. |
| 9,243,219 B2 | 1/2016 | Dimitrelos |
| 9,249,969 B2 | 2/2016 | Arai et al. |
| 9,259,513 B2 | 2/2016 | Bedwell et al. |
| 9,260,323 B2 | 2/2016 | Boodaghians et al. |

(56) References Cited

U.S. PATENT DOCUMENTS

| | | |
|---|---|---|
| 9,261,242 B2 | 2/2016 | Ge et al. |
| 9,265,356 B2 | 2/2016 | Glazman |
| 9,265,876 B1 | 2/2016 | Ben-Hur |
| 9,267,770 B2 | 2/2016 | Gaska et al. |
| 9,267,778 B2 | 2/2016 | Burch et al. |
| 9,273,849 B2 | 3/2016 | Schmid |
| 9,279,772 B2 * | 3/2016 | Sacquard ............... G01N 21/15 |
| 9,282,796 B2 | 3/2016 | Pugh et al. |
| 9,289,523 B2 | 3/2016 | Lee |
| 9,290,014 B2 | 3/2016 | Ohkawa et al. |
| 9,295,144 B2 | 3/2016 | Bora et al. |
| 9,295,742 B2 | 3/2016 | Rasooly et al. |
| 9,302,020 B2 | 4/2016 | Ullman |
| 9,304,273 B2 | 4/2016 | Childers |
| 9,318,649 B2 | 4/2016 | Eliason et al. |
| 9,321,281 B2 | 4/2016 | Heath |
| 9,321,658 B2 | 4/2016 | Chen et al. |
| 9,322,644 B2 | 4/2016 | Weinhold |
| 9,339,832 B2 | 5/2016 | Schrof et al. |
| 9,340,040 B2 | 5/2016 | Veis |
| 9,343,678 B2 | 5/2016 | Ko et al. |
| 9,346,288 B2 | 5/2016 | Childers |
| 9,351,555 B2 | 5/2016 | Li et al. |
| 9,360,177 B2 | 6/2016 | Mueckl et al. |
| 9,370,046 B2 | 6/2016 | Childers |
| 9,370,592 B2 | 6/2016 | Lee |
| 9,371,033 B2 | 6/2016 | Dellock et al. |
| 9,375,504 B2 | 6/2016 | Gowda et al. |
| 9,375,906 B2 | 6/2016 | Hong et al. |
| 9,376,333 B2 | 6/2016 | Boodaghians et al. |
| 9,381,458 B2 | 7/2016 | Blechschmidt et al. |
| 9,395,095 B2 | 7/2016 | Koo et al. |
| 9,399,687 B2 | 7/2016 | Ohara et al. |
| 9,409,515 B2 | 8/2016 | Salter et al. |
| 9,409,797 B2 | 8/2016 | Wipprich |
| 9,421,288 B2 | 8/2016 | Lowe |
| 9,421,395 B2 | 8/2016 | Ono et al. |
| 9,427,774 B1 | 8/2016 | Sheesley et al. |
| 9,434,169 B2 | 9/2016 | Kida et al. |
| 9,435,744 B2 | 9/2016 | Ghodousi et al. |
| 9,442,007 B2 | 9/2016 | Childers |
| 9,443,709 B2 | 9/2016 | Allsworth et al. |
| 9,457,120 B2 | 10/2016 | Matsui |
| 9,458,338 B2 | 10/2016 | Kagose et al. |
| 9,466,773 B2 | 10/2016 | Streppel et al. |
| 9,468,695 B2 | 10/2016 | Liao et al. |
| 9,468,699 B2 | 10/2016 | Park et al. |
| 9,469,771 B2 | 10/2016 | Mizutaki et al. |
| 9,475,708 B2 | 10/2016 | Rajagopalan et al. |
| 9,480,768 B2 | 11/2016 | Krosney et al. |
| 9,486,548 B2 | 11/2016 | Aurongzeb et al. |
| 9,486,640 B2 | 11/2016 | Thompson et al. |
| 9,487,010 B2 | 11/2016 | Tennis et al. |
| 9,488,331 B2 | 11/2016 | Sharrah |
| 9,492,574 B2 | 11/2016 | Rasooly et al. |
| 9,492,576 B1 | 11/2016 | Cudak et al. |
| 9,493,366 B2 | 11/2016 | Veoziedins et al. |
| 9,494,178 B2 | 11/2016 | Liu et al. |
| 9,498,550 B2 | 11/2016 | Kneissl et al. |
| 9,498,551 B2 | 11/2016 | Yanke |
| 9,498,900 B2 | 11/2016 | Newman |
| 9,498,977 B2 | 11/2016 | Allen et al. |
| 9,501,686 B2 | 11/2016 | Lin |
| 9,505,238 B2 | 11/2016 | Andrea-Tallada et al. |
| 9,505,239 B2 | 11/2016 | Veis et al. |
| 9,511,159 B2 | 12/2016 | Kreiner et al. |
| 9,511,163 B2 | 12/2016 | Larsen |
| 9,512,969 B1 | 12/2016 | Watson |
| 9,516,818 B2 | 12/2016 | Aikala |
| 9,517,280 B2 | 12/2016 | Lynn et al. |
| 9,517,282 B2 | 12/2016 | Horioka et al. |
| 9,522,201 B2 | 12/2016 | Sunkara et al. |
| 9,526,215 B2 | 12/2016 | Suntych |
| 9,527,307 B2 | 12/2016 | Edwards |
| 9,533,896 B2 | 1/2017 | Lee et al. |
| 9,539,824 B2 | 1/2017 | Masuda et al. |
| 9,546,288 B2 | 1/2017 | Hiraoka |
| 9,551,100 B2 | 1/2017 | Van Herpen |
| 9,555,262 B2 | 1/2017 | Blanche et al. |
| 9,563,119 B2 | 2/2017 | Lan |
| 9,565,771 B1 | 2/2017 | Stumm et al. |
| 9,566,358 B2 | 2/2017 | Koh et al. |
| 9,568,665 B2 | 2/2017 | Petluri et al. |
| 9,572,901 B2 | 2/2017 | Todeschini |
| 9,573,389 B2 | 2/2017 | Gould et al. |
| 9,582,700 B2 | 2/2017 | Auger |
| 9,586,460 B2 | 3/2017 | Gross et al. |
| 9,586,838 B2 | 3/2017 | Hansson et al. |
| 9,587,078 B2 | 3/2017 | Morizur et al. |
| 9,592,102 B2 | 3/2017 | Knight et al. |
| 9,592,312 B2 | 3/2017 | Lyslo et al. |
| 9,592,374 B2 | 3/2017 | Muse |
| 9,592,406 B2 | 3/2017 | DeWalt |
| 9,598,294 B2 | 3/2017 | Braunberger |
| 9,599,563 B2 | 3/2017 | Brass et al. |
| 9,603,956 B2 | 3/2017 | Newham |
| 9,604,480 B2 | 3/2017 | Albonetti et al. |
| 9,611,016 B2 | 4/2017 | Salters et al. |
| 9,611,400 B2 | 4/2017 | Sloan |
| 9,612,534 B2 | 4/2017 | Schattenburg et al. |
| 9,615,884 B2 | 4/2017 | Armour et al. |
| 9,617,171 B2 | 4/2017 | Rajagopalan et al. |
| 9,623,130 B2 | 4/2017 | Tumanov |
| 9,623,138 B2 | 4/2017 | Pagan et al. |
| 9,625,127 B2 | 4/2017 | Thomsen et al. |
| 9,625,372 B2 | 4/2017 | Bilenko et al. |
| 9,625,387 B2 | 4/2017 | Demos et al. |
| 9,637,653 B2 | 5/2017 | Yoda et al. |
| 9,638,394 B2 | 5/2017 | Cai et al. |
| 9,651,216 B2 | 5/2017 | Rodgers et al. |
| 9,653,009 B2 | 5/2017 | Rayhanian |
| 9,656,477 B2 | 5/2017 | Miura et al. |
| 9,662,410 B2 | 5/2017 | Mackin |
| 9,662,626 B2 | 5/2017 | Yates et al. |
| 9,662,906 B2 | 5/2017 | Kobayashi |
| 9,664,354 B1 | 5/2017 | Dellock et al. |
| 9,669,121 B2 | 6/2017 | Liao et al. |
| 9,669,615 B2 | 6/2017 | McPherson |
| 9,685,021 B2 | 6/2017 | Auger |
| 2002/0074559 A1 | 6/2002 | Dowling et al. |
| 2003/0024254 A1 | 2/2003 | Yoshida et al. |
| 2003/0026919 A1 | 2/2003 | Kojima et al. |
| 2003/0046947 A1 | 3/2003 | Ohya et al. |
| 2003/0098425 A1 | 5/2003 | Sosinsky |
| 2003/0205454 A1 | 11/2003 | Hlavinka et al. |
| 2004/0030368 A1 | 2/2004 | Kemeny et al. |
| 2004/0039242 A1 | 2/2004 | Tolkoff et al. |
| 2004/0056084 A1 | 3/2004 | Skinner |
| 2004/0079903 A1 | 4/2004 | Sosinsky |
| 2004/0081596 A1 | 4/2004 | Hsi |
| 2004/0093043 A1 | 5/2004 | Edel et al. |
| 2004/0120146 A1 | 6/2004 | Ostler et al. |
| 2004/0120151 A1 | 6/2004 | Ostler et al. |
| 2004/0141312 A1 | 7/2004 | Wolfram et al. |
| 2004/0150815 A1 | 8/2004 | Sones et al. |
| 2004/0155202 A1 | 8/2004 | Poteet et al. |
| 2004/0158300 A1 | 8/2004 | Gardiner |
| 2004/0164325 A1 | 8/2004 | Siegel |
| 2004/0175288 A1 | 9/2004 | Horton, III |
| 2004/0179079 A1 | 9/2004 | Yokoyama |
| 2004/0219056 A1 | 11/2004 | Tribelsky et al. |
| 2004/0233418 A1 | 11/2004 | Inukai |
| 2004/0250142 A1 | 12/2004 | Feyler |
| 2004/0251810 A1 | 12/2004 | Hsu |
| 2004/0262121 A1 | 12/2004 | Chien et al. |
| 2005/0000913 A1 | 1/2005 | Betterly |
| 2005/0013751 A1 | 1/2005 | Huang et al. |
| 2005/0017619 A1 | 1/2005 | Wan et al. |
| 2005/0042390 A1 | 2/2005 | Siegel |
| 2005/0064583 A1 | 3/2005 | Caruso et al. |
| 2005/0090722 A1 | 4/2005 | Perez |
| 2005/0096142 A1 | 5/2005 | Saunier |
| 2005/0128274 A1 | 6/2005 | Matsushima et al. |
| 2005/0148842 A1 | 7/2005 | Wang et al. |

(56) References Cited

U.S. PATENT DOCUMENTS

| | | |
|---|---|---|
| 2005/0154277 A1 | 7/2005 | Tang et al. |
| 2005/0177093 A1 | 8/2005 | Barry et al. |
| 2005/0187596 A1 | 8/2005 | Fiset |
| 2005/0211914 A1 | 9/2005 | Franken et al. |
| 2005/0239210 A1 | 10/2005 | Iida |
| 2005/0242013 A1 | 11/2005 | Hunter et al. |
| 2005/0258108 A1 | 11/2005 | Sanford |
| 2005/0261621 A1 | 11/2005 | Perez |
| 2005/0261622 A1 | 11/2005 | Perez |
| 2005/0265890 A1 | 12/2005 | Yang et al. |
| 2005/0266370 A1 | 12/2005 | Suzuki |
| 2005/0267451 A1 | 12/2005 | Black |
| 2005/0274965 A1 | 12/2005 | Phillips et al. |
| 2006/0004317 A1 | 1/2006 | Mauge et al. |
| 2006/0009821 A1 | 1/2006 | Perez |
| 2006/0108450 A1 | 5/2006 | Klinkenberg et al. |
| 2006/0121208 A1 | 6/2006 | Siegel |
| 2006/0122619 A1 | 6/2006 | Kablik et al. |
| 2006/0130853 A1 | 6/2006 | DiMauro et al. |
| 2006/0136019 A1 | 6/2006 | Kemeny et al. |
| 2006/0147339 A1 | 7/2006 | Hunter et al. |
| 2006/0155349 A1 | 7/2006 | Kemeny et al. |
| 2006/0182670 A1 | 8/2006 | Allen |
| 2006/0183072 A1 | 8/2006 | Black |
| 2006/0183987 A1 | 8/2006 | Murray |
| 2006/0188389 A1 | 8/2006 | Levy |
| 2006/0204670 A1 | 9/2006 | Siegel |
| 2006/0206173 A1 | 9/2006 | Gertner et al. |
| 2006/0213615 A1 | 9/2006 | Rastegar |
| 2006/0233501 A1 | 10/2006 | Sampson |
| 2006/0241726 A1 | 10/2006 | Whitehurst |
| 2006/0251827 A1 | 11/2006 | Nowak et al. |
| 2006/0259101 A1 | 11/2006 | Perez |
| 2006/0261285 A1 | 11/2006 | Broerman |
| 2006/0262174 A1 | 11/2006 | Aoai |
| 2006/0271024 A1 | 11/2006 | Gertner et al. |
| 2006/0272921 A1 | 12/2006 | Chien et al. |
| 2007/0021640 A1 | 1/2007 | Perez |
| 2007/0034239 A1 | 2/2007 | Park et al. |
| 2007/0053188 A1 | 3/2007 | New et al. |
| 2007/0054594 A1 | 3/2007 | Schmidt et al. |
| 2007/0086912 A1 | 4/2007 | Dowling et al. |
| 2007/0102280 A1 | 5/2007 | Hunter et al. |
| 2007/0104664 A1 | 5/2007 | Maltezos et al. |
| 2007/0123839 A1 | 5/2007 | Rousseau et al. |
| 2007/0131872 A1 | 6/2007 | Shearer et al. |
| 2007/0139504 A1 | 6/2007 | Siegel |
| 2007/0153514 A1 | 7/2007 | Dowling et al. |
| 2007/0165404 A1 | 7/2007 | Cheng |
| 2007/0181823 A1 | 8/2007 | Baumeister |
| 2007/0196235 A1 | 8/2007 | Shur et al. |
| 2007/0197677 A1 | 8/2007 | Tsuchimura et al. |
| 2007/0203550 A1 | 8/2007 | Perez |
| 2007/0207066 A1 | 9/2007 | Thur et al. |
| 2007/0211111 A1 | 9/2007 | Hayata |
| 2007/0246654 A1 | 10/2007 | Chien et al. |
| 2007/0253871 A1 | 11/2007 | Buhr |
| 2007/0267356 A1 | 11/2007 | Wong |
| 2007/0272757 A1 | 11/2007 | Pomranc et al. |
| 2007/0295916 A1 | 12/2007 | Reuben |
| 2007/0296706 A1 | 12/2007 | Wang et al. |
| 2008/0003665 A1 | 1/2008 | Potyrailo et al. |
| 2008/0008620 A1 | 1/2008 | Alexiadis |
| 2008/0014248 A1 | 1/2008 | Park et al. |
| 2008/0017787 A1 | 1/2008 | Okawa et al. |
| 2008/0024577 A1 | 1/2008 | Nakano et al. |
| 2008/0045865 A1 | 2/2008 | Kislev |
| 2008/0053164 A1 | 3/2008 | Park et al. |
| 2008/0058907 A1 | 3/2008 | Reuben |
| 2008/0073565 A1 | 3/2008 | Jeon |
| 2008/0074481 A1 | 3/2008 | Doo |
| 2008/0103560 A1 | 5/2008 | Powell et al. |
| 2008/0160211 A1 | 7/2008 | Siegel |
| 2008/0169423 A1 | 7/2008 | Betschart et al. |
| 2008/0172114 A1 | 7/2008 | Gourgouliatos et al. |
| 2008/0173832 A1 | 7/2008 | Chien et al. |
| 2008/0187679 A1 | 8/2008 | Sato et al. |
| 2008/0193665 A1 | 8/2008 | Oyanagi et al. |
| 2008/0212045 A1 | 9/2008 | Bader |
| 2008/0218998 A1 | 9/2008 | Quest et al. |
| 2008/0234670 A1 | 9/2008 | Rogers |
| 2008/0241017 A1 | 10/2008 | Lin et al. |
| 2008/0253941 A1 | 10/2008 | Withers et al. |
| 2008/0258742 A1 | 10/2008 | Dimitrakopoulos et al. |
| 2008/0260601 A1 | 10/2008 | Lyon |
| 2008/0272319 A1* | 11/2008 | Keh ............ G01J 1/04 250/552 |
| 2008/0286146 A1 | 11/2008 | Schroll et al. |
| 2008/0297767 A1 | 12/2008 | Goren et al. |
| 2008/0306454 A1 | 12/2008 | Sikora |
| 2009/0036954 A1 | 2/2009 | Ragazzi et al. |
| 2009/0038207 A1 | 2/2009 | Lin |
| 2009/0041632 A1 | 2/2009 | Day et al. |
| 2009/0065715 A1 | 3/2009 | Wainright |
| 2009/0067174 A1 | 3/2009 | Kao et al. |
| 2009/0073686 A1 | 3/2009 | Lai |
| 2009/0074976 A1 | 3/2009 | Freking et al. |
| 2009/0080679 A1 | 3/2009 | Rass |
| 2009/0086504 A1 | 4/2009 | Kim |
| 2009/0092764 A1 | 4/2009 | Hoeckelman |
| 2009/0122536 A1 | 5/2009 | Scholz |
| 2009/0145855 A1 | 6/2009 | Day et al. |
| 2009/0183943 A1 | 7/2009 | Leistner et al. |
| 2009/0187234 A1 | 7/2009 | Meyer et al. |
| 2009/0190344 A1 | 7/2009 | Worthington et al. |
| 2009/0192437 A1 | 7/2009 | Soltz et al. |
| 2009/0198169 A1 | 8/2009 | Baumeister |
| 2009/0204185 A1 | 8/2009 | De Kok et al. |
| 2009/0217547 A1 | 9/2009 | Kim et al. |
| 2009/0219488 A1 | 9/2009 | Dufour |
| 2009/0223806 A1 | 9/2009 | Thevenet et al. |
| 2009/0250626 A1 | 10/2009 | Schlesser et al. |
| 2009/0250715 A1 | 10/2009 | Lee et al. |
| 2009/0252654 A1 | 10/2009 | Hsu et al. |
| 2009/0252655 A1 | 10/2009 | Hsu et al. |
| 2009/0263298 A1 | 10/2009 | Hsu et al. |
| 2009/0295310 A1 | 12/2009 | Duerr et al. |
| 2009/0297399 A1 | 12/2009 | Ryan et al. |
| 2009/0316139 A1 | 12/2009 | Shrestha et al. |
| 2009/0320316 A1 | 12/2009 | Zakai |
| 2009/0323370 A1 | 12/2009 | Koo |
| 2010/0001211 A1 | 1/2010 | Huang et al. |
| 2010/0032353 A1 | 2/2010 | Frandsen |
| 2010/0032358 A1 | 2/2010 | Vestergaard Frandsen |
| 2010/0033708 A1 | 2/2010 | Kriz |
| 2010/0037330 A1 | 2/2010 | Siripattarapravat et al. |
| 2010/0085406 A1 | 4/2010 | Kimura |
| 2010/0102253 A1 | 4/2010 | Chang et al. |
| 2010/0121420 A1 | 5/2010 | Fiset et al. |
| 2010/0127984 A1 | 5/2010 | Chen |
| 2010/0129267 A1 | 5/2010 | Akutsu et al. |
| 2010/0133203 A1 | 6/2010 | Walker et al. |
| 2010/0154244 A1 | 6/2010 | Kuta et al. |
| 2010/0176067 A1 | 7/2010 | Boyd et al. |
| 2010/0185099 A1 | 7/2010 | Johansson et al. |
| 2010/0196622 A1 | 8/2010 | Van Pul et al. |
| 2010/0204761 A1 | 8/2010 | Murray |
| 2010/0236089 A1 | 9/2010 | Kawasaki et al. |
| 2010/0237254 A1 | 9/2010 | Mason et al. |
| 2010/0242299 A1 | 9/2010 | Siegel |
| 2010/0256541 A1 | 10/2010 | Pryor et al. |
| 2010/0256551 A1 | 10/2010 | Maltezos et al. |
| 2010/0259589 A1 | 10/2010 | Barry et al. |
| 2010/0260945 A1 | 10/2010 | Kites et al. |
| 2010/0267126 A1 | 10/2010 | Jacobs et al. |
| 2010/0270908 A1 | 10/2010 | Suzuki |
| 2010/0274328 A1 | 10/2010 | Morgan |
| 2010/0275807 A1 | 11/2010 | Landry et al. |
| 2010/0276059 A1 | 11/2010 | Tian et al. |
| 2010/0276410 A1 | 11/2010 | Hudson et al. |
| 2010/0314551 A1 | 12/2010 | Bettles et al. |
| 2011/0030560 A1 | 2/2011 | Bohlen et al. |
| 2011/0033346 A1 | 2/2011 | Bohlen et al. |
| 2011/0036997 A1 | 2/2011 | Lai |

(56) References Cited

U.S. PATENT DOCUMENTS

| | | |
|---|---|---|
| 2011/0048262 A1 | 3/2011 | Martinez et al. |
| 2011/0049391 A1 | 3/2011 | Yang |
| 2011/0054574 A1 | 3/2011 | Felix |
| 2011/0057123 A1 | 3/2011 | Ho |
| 2011/0061287 A1 | 3/2011 | Ogawa |
| 2011/0061988 A1 | 3/2011 | Lonsdale |
| 2011/0072994 A1 | 3/2011 | Sugiyama et al. |
| 2011/0076636 A1 | 3/2011 | Wolff et al. |
| 2011/0091698 A1 | 4/2011 | Zhou et al. |
| 2011/0096377 A1 | 4/2011 | Saito |
| 2011/0103864 A1 | 5/2011 | Guo et al. |
| 2011/0106223 A1 | 5/2011 | Fenyo et al. |
| 2011/0126370 A1 | 6/2011 | Reuben |
| 2011/0130704 A1 | 6/2011 | Baldo et al. |
| 2011/0132077 A1 | 6/2011 | Killeen et al. |
| 2011/0212410 A1 | 9/2011 | Fiset |
| 2011/0213339 A1 | 9/2011 | Bak |
| 2011/0240880 A1 | 10/2011 | Fraser et al. |
| 2011/0240885 A1 | 10/2011 | Benaron et al. |
| 2011/0250405 A1 | 10/2011 | Sawatsky |
| 2011/0284773 A1 | 11/2011 | Pugh et al. |
| 2011/0286882 A1 | 11/2011 | Wu |
| 2011/0290179 A1 | 12/2011 | Stowell et al. |
| 2011/0291022 A1 | 12/2011 | Lee et al. |
| 2012/0021134 A1 | 1/2012 | Kolb et al. |
| 2012/0050520 A1 | 3/2012 | Thoren et al. |
| 2012/0050852 A1 | 3/2012 | Angelini et al. |
| 2012/0071954 A1 | 3/2012 | Kao et al. |
| 2012/0085500 A1 | 4/2012 | Knapke et al. |
| 2012/0085935 A1 | 4/2012 | Nasef |
| 2012/0096657 A1 | 4/2012 | So et al. |
| 2012/0120385 A1 | 5/2012 | Jiang |
| 2012/0126134 A1 | 5/2012 | Deal et al. |
| 2012/0128890 A1 | 5/2012 | Mirchev |
| 2012/0148833 A1 | 6/2012 | Cao et al. |
| 2012/0161170 A1 | 6/2012 | Dubuc et al. |
| 2012/0172419 A1 | 7/2012 | Neitz et al. |
| 2012/0194622 A1 | 8/2012 | Iraqi et al. |
| 2012/0199005 A1 | 8/2012 | Koji et al. |
| 2012/0209326 A1 | 8/2012 | Lutes et al. |
| 2012/0228528 A1 | 9/2012 | Koo |
| 2012/0229583 A1 | 9/2012 | Fukumoto et al. |
| 2012/0242765 A1 | 9/2012 | Battaglia et al. |
| 2012/0256744 A1 | 10/2012 | Chen |
| 2012/0257374 A1 | 10/2012 | Daniel |
| 2012/0273698 A1 | 11/2012 | Gudgell et al. |
| 2012/0274717 A1 | 11/2012 | Nakano et al. |
| 2012/0279503 A1 | 11/2012 | Zhou et al. |
| 2012/0283621 A1 | 11/2012 | Muller |
| 2012/0283622 A1 | 11/2012 | Nath |
| 2012/0293626 A1 | 11/2012 | Lee et al. |
| 2012/0311925 A1 | 12/2012 | Aikala et al. |
| 2012/0318749 A1 | 12/2012 | Stokes et al. |
| 2012/0319617 A1 | 12/2012 | Yen |
| 2012/0327147 A1 | 12/2012 | Okawa et al. |
| 2013/0004367 A1 | 1/2013 | Roberts |
| 2013/0008085 A1 | 1/2013 | Aikala et al. |
| 2013/0008196 A1 | 1/2013 | Poyet |
| 2013/0015753 A1 | 1/2013 | Son et al. |
| 2013/0026682 A1 | 1/2013 | Rist et al. |
| 2013/0048545 A1 | 2/2013 | Shatalov et al. |
| 2013/0052090 A1 | 2/2013 | Bohlen |
| 2013/0052363 A1 | 2/2013 | Kuniyasu et al. |
| 2013/0064986 A1 | 3/2013 | Kuniyasu et al. |
| 2013/0068385 A1 | 3/2013 | Auger et al. |
| 2013/0101837 A1 | 4/2013 | Cao et al. |
| 2013/0111779 A1 | 5/2013 | Lee |
| 2013/0134447 A1 | 5/2013 | Pan et al. |
| 2013/0161531 A1 | 6/2013 | Haile |
| 2013/0183067 A1 | 7/2013 | Degott et al. |
| 2013/0201700 A1* | 8/2013 | Tamura ............... F21V 23/02 362/382 |
| 2013/0207002 A1 | 8/2013 | Greuel et al. |
| 2013/0226069 A1 | 8/2013 | Kim et al. |
| 2013/0228707 A1 | 9/2013 | Nieminen |
| 2013/0258016 A1 | 10/2013 | Yoshida et al. |
| 2013/0258018 A1 | 10/2013 | Nakajima et al. |
| 2013/0266402 A1 | 10/2013 | Meyers et al. |
| 2013/0267803 A1 | 10/2013 | Kramer |
| 2013/0281947 A1 | 10/2013 | Quisenberry |
| 2013/0283691 A1 | 10/2013 | Cosic |
| 2013/0286120 A1 | 10/2013 | Kobayashi et al. |
| 2013/0286121 A1 | 10/2013 | Fukumoto et al. |
| 2013/0296978 A1 | 11/2013 | Fiset |
| 2013/0317574 A1 | 11/2013 | Gourgouliatos et al. |
| 2013/0323119 A1 | 12/2013 | Alwan |
| 2013/0326941 A1 | 12/2013 | Pickett et al. |
| 2014/0008548 A1 | 1/2014 | Rudolph et al. |
| 2014/0014857 A1 | 1/2014 | Martinez et al. |
| 2014/0017135 A1 | 1/2014 | Boodaghians et al. |
| 2014/0048494 A1 | 2/2014 | Simmons, Jr. |
| 2014/0105784 A1 | 4/2014 | Smeeton et al. |
| 2014/0113082 A1 | 4/2014 | Ohnishi |
| 2014/0117051 A1 | 5/2014 | Duquet |
| 2014/0118451 A1 | 5/2014 | Nakane et al. |
| 2014/0120268 A1 | 5/2014 | Akiyama et al. |
| 2014/0124655 A1 | 5/2014 | Rivero et al. |
| 2014/0131591 A1 | 5/2014 | Basu et al. |
| 2014/0146519 A1 | 5/2014 | Chang et al. |
| 2014/0154769 A1 | 6/2014 | del Ninno et al. |
| 2014/0166901 A1 | 6/2014 | Haile |
| 2014/0173927 A1 | 6/2014 | Kim et al. |
| 2014/0188198 A1 | 7/2014 | Spector |
| 2014/0202948 A1 | 7/2014 | Li |
| 2014/0219881 A1 | 8/2014 | Riebel |
| 2014/0220255 A1 | 8/2014 | Akiyama et al. |
| 2014/0231677 A1 | 8/2014 | Cheng |
| 2014/0240695 A1 | 8/2014 | Pagan et al. |
| 2014/0246611 A1 | 9/2014 | Sacquard et al. |
| 2014/0263091 A1 | 9/2014 | Carter, III et al. |
| 2014/0265039 A1 | 9/2014 | Bellec et al. |
| 2014/0273197 A1 | 9/2014 | Chen et al. |
| 2014/0275321 A1 | 9/2014 | Morizur et al. |
| 2014/0294668 A1 | 10/2014 | Lee |
| 2014/0322073 A1 | 10/2014 | Link et al. |
| 2014/0336495 A1 | 11/2014 | Bittner |
| 2014/0342099 A1 | 11/2014 | Hung et al. |
| 2014/0346124 A1 | 11/2014 | Barbati et al. |
| 2014/0346372 A1 | 11/2014 | Vu et al. |
| 2014/0353256 A1 | 12/2014 | Kaschek et al. |
| 2014/0356563 A1 | 12/2014 | Yang et al. |
| 2014/0360213 A1 | 12/2014 | Son et al. |
| 2014/0362428 A1 | 12/2014 | Chen |
| 2014/0368103 A1 | 12/2014 | Son et al. |
| 2014/0371710 A1 | 12/2014 | Williamson |
| 2014/0373442 A1 | 12/2014 | Aikala et al. |
| 2014/0378792 A1 | 12/2014 | Krimsky et al. |
| 2015/0008738 A1 | 1/2015 | Huda |
| 2015/0025601 A1 | 1/2015 | Fiset |
| 2015/0032044 A9 | 1/2015 | Peyman |
| 2015/0033784 A1 | 2/2015 | Park et al. |
| 2015/0034545 A1 | 2/2015 | Park et al. |
| 2015/0037016 A1 | 2/2015 | Norman et al. |
| 2015/0037983 A1 | 2/2015 | Bernhardt et al. |
| 2015/0049486 A1 | 2/2015 | Jung et al. |
| 2015/0050427 A1 | 2/2015 | Claes et al. |
| 2015/0057650 A1 | 2/2015 | Grosser |
| 2015/0060702 A1 | 3/2015 | Karlicek |
| 2015/0064061 A1 | 3/2015 | Taghipour |
| 2015/0064064 A1 | 3/2015 | Kim et al. |
| 2015/0064069 A1 | 3/2015 | Yi et al. |
| 2015/0069263 A1 | 3/2015 | Moyal |
| 2015/0076367 A1 | 3/2015 | Callaghan et al. |
| 2015/0076368 A1 | 3/2015 | Sargent et al. |
| 2015/0079307 A1 | 3/2015 | Schadt et al. |
| 2015/0082654 A1 | 3/2015 | Jaegal et al. |
| 2015/0082655 A1 | 3/2015 | Rae et al. |
| 2015/0085040 A1 | 3/2015 | Rae et al. |
| 2015/0096549 A1 | 4/2015 | Borghi |
| 2015/0098059 A1 | 4/2015 | Ou-Yang et al. |
| 2015/0101235 A1 | 4/2015 | Ogawa |
| 2015/0114912 A1 | 4/2015 | Taghipour |
| 2015/0118101 A1 | 4/2015 | Cauley |
| 2015/0124032 A1 | 5/2015 | De Mondt et al. |

(56) References Cited

U.S. PATENT DOCUMENTS

| | | |
|---|---|---|
| 2015/0132470 A1 | 5/2015 | Namba |
| 2015/0137762 A1 | 5/2015 | Kim et al. |
| 2015/0144575 A1 | 5/2015 | Hawkins, II |
| 2015/0147557 A1 | 5/2015 | Morizur et al. |
| 2015/0148776 A1 | 5/2015 | Sobue et al. |
| 2015/0151553 A1 | 6/2015 | Cofler et al. |
| 2015/0158741 A1 | 6/2015 | Lee et al. |
| 2015/0158750 A1 | 6/2015 | Schiffmann |
| 2015/0165078 A1 | 6/2015 | Nevin |
| 2015/0165185 A1 | 6/2015 | Cohen et al. |
| 2015/0173379 A1 | 6/2015 | Lee et al. |
| 2015/0174528 A1 | 6/2015 | Son et al. |
| 2015/0183163 A1 | 7/2015 | Beak et al. |
| 2015/0183663 A1 | 7/2015 | Kuik et al. |
| 2015/0196706 A1 | 7/2015 | Radwanski et al. |
| 2015/0212074 A1 | 7/2015 | Xiang et al. |
| 2015/0216222 A1 | 8/2015 | Maeng et al. |
| 2015/0223403 A1 | 8/2015 | Aikala et al. |
| 2015/0223749 A1 | 8/2015 | Park et al. |
| 2015/0224680 A1 | 8/2015 | Oestergaard et al. |
| 2015/0270489 A1 | 9/2015 | Pan et al. |
| 2015/0273868 A1 | 10/2015 | Vodopivec et al. |
| 2015/0273872 A1 | 10/2015 | Fukumoto et al. |
| 2015/0289528 A1 | 10/2015 | Gooden et al. |
| 2015/0290675 A1 | 10/2015 | Lin |
| 2015/0297858 A1 | 10/2015 | James et al. |
| 2015/0297877 A1 | 10/2015 | Pelkus |
| 2015/0314024 A1 | 11/2015 | Khan et al. |
| 2015/0322287 A1 | 11/2015 | Ishmael et al. |
| 2015/0322392 A1 | 11/2015 | Mars |
| 2015/0325323 A1 | 11/2015 | Brukilacchio |
| 2015/0328834 A1 | 11/2015 | Bauer et al. |
| 2015/0336076 A1 | 11/2015 | Zhang et al. |
| 2015/0336372 A1 | 11/2015 | Van Ness |
| 2015/0340612 A1 | 11/2015 | Pan et al. |
| 2015/0344324 A1 | 12/2015 | O'Donnell |
| 2015/0348350 A1 | 12/2015 | Collins, Jr. et al. |
| 2015/0355084 A1 | 12/2015 | White |
| 2015/0359922 A1 | 12/2015 | Kim et al. |
| 2015/0360477 A1 | 12/2015 | Khe et al. |
| 2015/0360924 A1 | 12/2015 | Orita |
| 2015/0367317 A1 | 12/2015 | Hwang |
| 2015/0368493 A1 | 12/2015 | Yamada |
| 2016/0001108 A1 | 1/2016 | Zhou et al. |
| 2016/0001578 A1 | 1/2016 | Kobayashi et al. |
| 2016/0003788 A1 | 1/2016 | Lundeberg et al. |
| 2016/0008624 A1 | 1/2016 | Grossman |
| 2016/0009570 A1 | 1/2016 | Yu |
| 2016/0015288 A1 | 1/2016 | Neitz et al. |
| 2016/0015962 A1 | 1/2016 | Shokoueinejad et al. |
| 2016/0016337 A1 | 1/2016 | Kobayashi |
| 2016/0018376 A1 | 1/2016 | Hammerschmidt |
| 2016/0021864 A1 | 1/2016 | Koo et al. |
| 2016/0021865 A1 | 1/2016 | Koo et al. |
| 2016/0027230 A1 | 1/2016 | Decoux |
| 2016/0030612 A1 | 2/2016 | Kim et al. |
| 2016/0033714 A1 | 2/2016 | Liu |
| 2016/0035449 A1 | 2/2016 | Putterman et al. |
| 2016/0036952 A1 | 2/2016 | Kim et al. |
| 2016/0038624 A1 | 2/2016 | Krosney |
| 2016/0038970 A1 | 2/2016 | Molin |
| 2016/0046134 A1 | 2/2016 | Fukumoto et al. |
| 2016/0051719 A1 | 2/2016 | Watanabe et al. |
| 2016/0052299 A1 | 2/2016 | Barberan Latorre |
| 2016/0052802 A1 | 2/2016 | Ochi et al. |
| 2016/0053984 A1 | 2/2016 | Callaghan et al. |
| 2016/0056065 A1 | 2/2016 | Stahlbush |
| 2016/0058020 A1 | 3/2016 | Shur et al. |
| 2016/0067520 A1 | 3/2016 | McNeill |
| 2016/0074545 A1 | 3/2016 | Kim |
| 2016/0074759 A1 | 3/2016 | Kelly et al. |
| 2016/0082281 A1 | 3/2016 | Gerber et al. |
| 2016/0088868 A1 | 3/2016 | Dobrinsky et al. |
| 2016/0089206 A1 | 3/2016 | Lee et al. |
| 2016/0089460 A1 | 3/2016 | Jeong et al. |
| 2016/0089694 A1 | 3/2016 | Jih |
| 2016/0095409 A1 | 4/2016 | Jih |
| 2016/0101294 A1 | 4/2016 | Sun et al. |
| 2016/0102815 A1 | 4/2016 | Bailey et al. |
| 2016/0102845 A1 | 4/2016 | Scribante et al. |
| 2016/0106504 A1 | 4/2016 | Casalino et al. |
| 2016/0106872 A1 | 4/2016 | Martinez |
| 2016/0107460 A1 | 4/2016 | Weingartner |
| 2016/0121006 A1 | 5/2016 | Wu |
| 2016/0121009 A1 | 5/2016 | Farr et al. |
| 2016/0121012 A1 | 5/2016 | Krosney |
| 2016/0129279 A1 | 5/2016 | Ferolito |
| 2016/0136312 A1 | 5/2016 | Park et al. |
| 2016/0136313 A1 | 5/2016 | Nguyen et al. |
| 2016/0138818 A1 | 5/2016 | Fitsch et al. |
| 2016/0151520 A1 | 6/2016 | Lee et al. |
| 2016/0151645 A1 | 6/2016 | Williamson |
| 2016/0152044 A1 | 6/2016 | Yoshida et al. |
| 2016/0153619 A1 | 6/2016 | Frohnapfel |
| 2016/0155367 A1 | 6/2016 | Rich et al. |
| 2016/0158569 A1 | 6/2016 | Mofar |
| 2016/0175608 A1 | 6/2016 | Livingston |
| 2016/0175610 A1 | 6/2016 | Livingston et al. |
| 2016/0177452 A1 | 6/2016 | Iwashita |
| 2016/0184467 A1 | 6/2016 | Cheng et al. |
| 2016/0186324 A1 | 6/2016 | Iwashita |
| 2016/0189923 A1 | 6/2016 | Juodkazis et al. |
| 2016/0197275 A1 | 7/2016 | Pan et al. |
| 2016/0200119 A1 | 7/2016 | Rae et al. |
| 2016/0200594 A1 | 7/2016 | Chen et al. |
| 2016/0205981 A1 | 7/2016 | Chalupa et al. |
| 2016/0208998 A1 | 7/2016 | Greinke |
| 2016/0212984 A1 | 7/2016 | Fang et al. |
| 2016/0213799 A1 | 7/2016 | Ullman |
| 2016/0217880 A1 | 7/2016 | Liao et al. |
| 2016/0220922 A1 | 8/2016 | Kamen et al. |
| 2016/0221326 A1 | 8/2016 | Auger et al. |
| 2016/0221362 A1 | 8/2016 | Aoike et al. |
| 2016/0223151 A1 | 8/2016 | Choi et al. |
| 2016/0229173 A1 | 8/2016 | Boyksen |
| 2016/0231054 A1 | 8/2016 | Callaghan et al. |
| 2016/0236006 A1 | 8/2016 | Donitzky et al. |
| 2016/0243814 A1 | 8/2016 | Schaefer et al. |
| 2016/0250807 A1 | 9/2016 | Atwood |
| 2016/0256590 A1 | 9/2016 | Taghipour |
| 2016/0257066 A1 | 9/2016 | Atwood et al. |
| 2016/0257135 A1 | 9/2016 | Grigore et al. |
| 2016/0271280 A1 | 9/2016 | Liao et al. |
| 2016/0273833 A1 | 9/2016 | Haile et al. |
| 2016/0278424 A1 | 9/2016 | Liao et al. |
| 2016/0279593 A1 | 9/2016 | Riebel |
| 2016/0280562 A1 | 9/2016 | Liao et al. |
| 2016/0296650 A1 | 10/2016 | Liao et al. |
| 2016/0297224 A1 | 10/2016 | Edwards |
| 2016/0303394 A1 | 10/2016 | Hayashi et al. |
| 2016/0303395 A1 | 10/2016 | Moffat |
| 2016/0311699 A1 | 10/2016 | Burseth et al. |
| 2016/0314374 A1 | 10/2016 | Braumandl |
| 2016/0323973 A1 | 11/2016 | Nakano |
| 2016/0325606 A1 | 11/2016 | Kim et al. |
| 2016/0327475 A1 | 11/2016 | Hayashi et al. |
| 2016/0331487 A1 | 11/2016 | Newman et al. |
| 2016/0331856 A1 | 11/2016 | Smith |
| 2016/0331993 A1 | 11/2016 | Moyer |
| 2016/0334381 A1 | 11/2016 | King-Smith et al. |
| 2016/0354503 A1 | 12/2016 | Hutchens et al. |
| 2016/0355412 A1 | 12/2016 | Collins et al. |
| 2016/0367767 A1 | 12/2016 | Cashman et al. |
| 2016/0369447 A1 | 12/2016 | Spill et al. |
| 2017/0000041 A1 | 1/2017 | Wargent |
| 2017/0006993 A1 | 1/2017 | Rivero et al. |
| 2017/0007846 A1 | 1/2017 | Rabin et al. |
| 2017/0009956 A1 | 1/2017 | Nichols |
| 2017/0016589 A1 | 1/2017 | Greinke |
| 2017/0021189 A1 | 1/2017 | Thompson et al. |
| 2017/0021640 A1 | 1/2017 | Heath |
| 2017/0021652 A1 | 1/2017 | Gottschalt et al. |
| 2017/0023265 A1 | 1/2017 | Park et al. |
| 2017/0026560 A1 | 1/2017 | Whitehouse et al. |

(56) References Cited

U.S. PATENT DOCUMENTS

| | | |
|---|---|---|
| 2017/0028707 A1 | 2/2017 | Veis |
| 2017/0029292 A1 | 2/2017 | Rajagopalan et al. |
| 2017/0035920 A1 | 2/2017 | Boodaghians et al. |
| 2017/0036458 A1 | 2/2017 | Andrea Talleda et al. |
| 2017/0036460 A1 | 2/2017 | Cong et al. |
| 2017/0039795 A1 | 2/2017 | Collins, Jr. et al. |
| 2017/0043368 A1 | 2/2017 | Wilson et al. |
| 2017/0056808 A1 | 3/2017 | Hayden |
| 2017/0056915 A1 | 3/2017 | Hayden |
| 2017/0057252 A1 | 3/2017 | Mitsuzawa |
| 2017/0059400 A1 | 3/2017 | Murphy et al. |
| 2017/0072077 A1 | 3/2017 | Baker et al. |
| 2017/0072078 A1 | 3/2017 | Lee et al. |
| 2017/0080116 A1 | 3/2017 | Kreiner et al. |
| 2017/0080251 A1 | 3/2017 | Yehezkel |
| 2017/0087262 A1 | 3/2017 | Toita et al. |
| 2017/0087876 A1 | 3/2017 | Nakajima et al. |
| 2017/0089843 A1 | 3/2017 | Gasperino et al. |
| 2017/0094911 A1 | 4/2017 | Suntych |
| 2017/0095582 A1 | 4/2017 | Shur et al. |
| 2017/0097150 A1 | 4/2017 | Chen et al. |
| 2017/0097155 A1 | 4/2017 | Perez Tomas et al. |
| 2017/0099828 A1 | 4/2017 | Ronning |
| 2017/0100704 A1 | 4/2017 | Haile |
| 2017/0100989 A1 | 4/2017 | Chapaton et al. |
| 2017/0106669 A1 | 4/2017 | Edwards |
| 2017/0121701 A1 | 5/2017 | Dobrinsky et al. |
| 2017/0128982 A1 | 5/2017 | Sheesley et al. |
| 2017/0135173 A1 | 5/2017 | Huang |
| 2017/0136260 A1 | 5/2017 | Campos |
| 2017/0143868 A1 | 5/2017 | Huang et al. |
| 2017/0144476 A1 | 5/2017 | Postle et al. |
| 2017/0144899 A1 | 5/2017 | Braunberger |
| 2017/0147843 A1 | 5/2017 | Todeschini |
| 2017/0152158 A1 | 6/2017 | Braunberger |
| 2017/0158529 A1 | 6/2017 | Rimbault et al. |
| 2017/0158857 A1 | 6/2017 | Miyake et al. |
| 2017/0159182 A1 | 6/2017 | Iwashita |
| 2017/0166457 A1 | 6/2017 | Rimbault et al. |
| 2017/0166458 A1 | 6/2017 | Rimbault et al. |
| 2017/0170204 A1 | 6/2017 | Iwasaka et al. |

FOREIGN PATENT DOCUMENTS

| | | | |
|---|---|---|---|
| EP | 1134491 | A2 | 9/2001 |
| EP | 1164553 | A2 | 12/2001 |
| EP | 1220165 | A2 | 7/2002 |
| EP | 0802430 | B1 | 3/2003 |
| EP | 1163552 | B1 | 8/2003 |
| EP | 1254435 | B1 | 11/2003 |
| EP | 1378493 | A2 | 1/2004 |
| EP | 1378868 | A2 | 1/2004 |
| EP | 1245007 | B1 | 10/2004 |
| EP | 1334031 | B1 | 12/2004 |
| EP | 1379312 | B1 | 11/2005 |
| EP | 1602774 | A1 | 12/2005 |
| EP | 1614442 | A2 | 1/2006 |
| EP | 1426191 | B1 | 2/2006 |
| EP | 1228738 | B1 | 3/2006 |
| EP | 1339341 | B1 | 3/2006 |
| EP | 1336389 | B1 | 4/2006 |
| EP | 1498274 | B1 | 4/2006 |
| EP | 1494880 | B1 | 5/2006 |
| EP | 1592522 | B1 | 6/2006 |
| EP | 0996099 | B1 | 7/2006 |
| EP | 1684037 | A1 | 7/2006 |
| EP | 1520718 | B1 | 8/2006 |
| EP | 1562865 | B1 | 10/2006 |
| EP | 1795503 | A1 | 6/2007 |
| EP | 1599340 | B1 | 9/2007 |
| EP | 1829680 | A1 | 9/2007 |
| EP | 1847377 | A2 | 10/2007 |
| EP | 1847378 | A2 | 10/2007 |
| EP | 1857416 | A2 | 11/2007 |
| EP | 1701801 | B1 | 3/2008 |
| EP | 1762599 | B1 | 3/2008 |
| EP | 1902740 | A1 | 3/2008 |
| EP | 1912020 | A1 | 4/2008 |
| EP | 1918793 | A1 | 5/2008 |
| EP | 1927849 | A1 | 6/2008 |
| EP | 1932672 | A2 | 6/2008 |
| EP | 1242665 | B2 | 7/2008 |
| EP | 1474488 | B1 | 7/2008 |
| EP | 1953709 | A1 | 8/2008 |
| EP | 1958788 | A1 | 8/2008 |
| EP | 1961442 | A1 | 8/2008 |
| EP | 1569178 | B1 | 11/2008 |
| EP | 1990080 | A1 | 11/2008 |
| EP | 1990380 | A1 | 11/2008 |
| EP | 1724315 | B1 | 12/2008 |
| EP | 1624931 | B1 | 2/2009 |
| EP | 1545866 | B1 | 3/2009 |
| EP | 1100366 | B1 | 4/2009 |
| EP | 1428668 | B1 | 4/2009 |
| EP | 1754758 | B1 | 4/2009 |
| EP | 2040079 | B1 | 5/2009 |
| EP | 2072269 | A1 | 6/2009 |
| EP | 1287496 | B1 | 7/2009 |
| EP | 1923627 | B1 | 8/2009 |
| EP | 2124074 | A1 | 11/2009 |
| EP | 2127684 | A1 | 12/2009 |
| EP | 1535495 | B1 | 1/2010 |
| EP | 1954507 | B1 | 1/2010 |
| EP | 2141427 | A1 | 1/2010 |
| EP | 1627746 | B1 | 3/2010 |
| EP | 1428669 | B1 | 4/2010 |
| EP | 1430287 | B1 | 4/2010 |
| EP | 1651128 | B1 | 4/2010 |
| EP | 1778477 | B1 | 4/2010 |
| EP | 1701803 | B1 | 5/2010 |
| EP | 2095964 | B1 | 5/2010 |
| EP | 1528388 | B1 | 8/2010 |
| EP | 2221780 | A1 | 8/2010 |
| EP | 1988136 | B1 | 9/2010 |
| EP | 1575669 | B1 | 10/2010 |
| EP | 2243414 | A2 | 10/2010 |
| EP | 1783184 | B1 | 1/2011 |
| EP | 1829684 | B1 | 1/2011 |
| EP | 1930170 | B1 | 1/2011 |
| EP | 1091205 | B1 | 2/2011 |
| EP | 2287524 | A1 | 2/2011 |
| EP | 1905606 | B1 | 3/2011 |
| EP | 2296361 | A1 | 3/2011 |
| EP | 1879491 | B1 | 4/2011 |
| EP | 1887297 | B1 | 4/2011 |
| EP | 2145931 | B1 | 5/2011 |
| EP | 1618514 | B1 | 6/2011 |
| EP | 1629979 | B1 | 8/2011 |
| EP | 1519839 | B1 | 10/2011 |
| EP | 1752081 | B1 | 10/2011 |
| EP | 2385294 | A2 | 11/2011 |
| EP | 2388146 | A2 | 11/2011 |
| EP | 2400324 | A1 | 12/2011 |
| EP | 1997398 | B1 | 1/2012 |
| EP | 1459896 | B1 | 2/2012 |
| EP | 1468834 | B1 | 2/2012 |
| EP | 1579995 | B1 | 2/2012 |
| EP | 1624796 | B1 | 2/2012 |
| EP | 2040482 | B1 | 2/2012 |
| EP | 2307605 | B1 | 3/2012 |
| EP | 1905273 | B1 | 4/2012 |
| EP | 1960583 | B1 | 5/2012 |
| EP | 2452823 | A2 | 5/2012 |
| EP | 2301752 | B1 | 6/2012 |
| EP | 2335940 | B1 | 7/2012 |
| EP | 2491956 | A1 | 8/2012 |
| EP | 1992486 | B1 | 10/2012 |
| EP | 1624803 | B1 | 11/2012 |
| EP | 2522519 | A2 | 11/2012 |
| EP | 2543707 | A1 | 1/2013 |
| EP | 2376837 | B1 | 2/2013 |
| EP | 2568022 | A2 | 3/2013 |
| EP | 2164566 | B1 | 5/2013 |
| EP | 1764220 | B1 | 6/2013 |

(56) References Cited

FOREIGN PATENT DOCUMENTS

| | | |
|---|---|---|
| EP | 2350987 B1 | 6/2013 |
| EP | 2095439 B1 | 7/2013 |
| EP | 2610014 A2 | 7/2013 |
| EP | 2618129 A1 | 7/2013 |
| EP | 2083773 B1 | 8/2013 |
| EP | 2334340 B1 | 8/2013 |
| EP | 1849138 B1 | 9/2013 |
| EP | 2392473 B1 | 9/2013 |
| EP | 1896766 B1 | 10/2013 |
| EP | 2438230 B1 | 10/2013 |
| EP | 2644665 A1 | 10/2013 |
| EP | 2644666 A1 | 10/2013 |
| EP | 2302007 B1 | 1/2014 |
| EP | 2682737 A1 | 1/2014 |
| EP | 2682738 A1 | 1/2014 |
| EP | 2682739 A1 | 1/2014 |
| EP | 2684484 A1 | 1/2014 |
| EP | 2468090 B1 | 3/2014 |
| EP | 2233292 B1 | 4/2014 |
| EP | 2554583 B1 | 4/2014 |
| EP | 2717036 A1 | 4/2014 |
| EP | 1960585 B1 | 5/2014 |
| EP | 2089064 B1 | 5/2014 |
| EP | 2314802 B1 | 5/2014 |
| EP | 1900433 B1 | 7/2014 |
| EP | 2302011 B1 | 7/2014 |
| EP | 2344353 B1 | 8/2014 |
| EP | 2765000 A1 | 8/2014 |
| EP | 2765372 A2 | 8/2014 |
| EP | 2767154 A1 | 8/2014 |
| EP | 2355855 B1 | 9/2014 |
| EP | 2772314 A1 | 9/2014 |
| EP | 2272324 B1 | 10/2014 |
| EP | 2567713 B1 | 10/2014 |
| EP | 2786807 A1 | 10/2014 |
| EP | 2792422 A1 | 10/2014 |
| EP | 1945330 B1 | 12/2014 |
| EP | 1958778 B1 | 12/2014 |
| EP | 2829518 A1 | 1/2015 |
| EP | 2535640 B1 | 2/2015 |
| EP | 2508255 B1 | 3/2015 |
| EP | 2632738 B1 | 3/2015 |
| EP | 2842518 A1 | 3/2015 |
| EP | 2848321 A2 | 3/2015 |
| EP | 2851198 A1 | 3/2015 |
| EP | 2851637 A1 | 3/2015 |
| EP | 1687081 B1 | 4/2015 |
| EP | 2636534 B1 | 4/2015 |
| EP | 2696155 B1 | 4/2015 |
| EP | 2698056 B1 | 4/2015 |
| EP | 2853151 A1 | 4/2015 |
| EP | 2857755 A1 | 4/2015 |
| EP | 2865939 A1 | 4/2015 |
| EP | 2675627 B1 | 5/2015 |
| EP | 2644405 B1 | 6/2015 |
| EP | 2886934 A2 | 6/2015 |
| EP | 2253290 B1 | 7/2015 |
| EP | 2510958 B1 | 7/2015 |
| EP | 2669095 B1 | 7/2015 |
| EP | 2745730 B1 | 7/2015 |
| EP | 2206608 B1 | 8/2015 |
| EP | 2671722 B1 | 8/2015 |
| EP | 2908050 A1 | 8/2015 |
| EP | 2004554 B1 | 9/2015 |
| EP | 2915546 A1 | 9/2015 |
| EP | 2921183 A1 | 9/2015 |
| EP | 2923847 A1 | 9/2015 |
| EP | 2445722 B1 | 10/2015 |
| EP | 2323952 B1 | 11/2015 |
| EP | 2016342 B1 | 12/2015 |
| EP | 2611493 B1 | 12/2015 |
| EP | 2959921 A1 | 12/2015 |
| EP | 2129212 B1 | 1/2016 |
| EP | 2966025 A1 | 1/2016 |
| EP | 2394963 B1 | 2/2016 |
| EP | 2987635 A1 | 2/2016 |
| EP | 2424911 B1 | 3/2016 |
| EP | 2857198 B1 | 3/2016 |
| EP | 1866954 B1 | 4/2016 |
| EP | 3002013 A1 | 4/2016 |
| EP | 3005969 A2 | 4/2016 |
| EP | 3006406 A1 | 4/2016 |
| EP | 3023946 A1 | 5/2016 |
| EP | 2821240 B1 | 6/2016 |
| EP | 2124104 B1 | 7/2016 |
| EP | 2156090 B1 | 7/2016 |
| EP | 2651536 B1 | 7/2016 |
| EP | 3043244 A1 | 7/2016 |
| EP | 3045319 A1 | 7/2016 |
| EP | 2470309 B1 | 8/2016 |
| EP | 2500060 B1 | 8/2016 |
| EP | 2601052 B1 | 8/2016 |
| EP | 2736652 B1 | 8/2016 |
| EP | 2823969 B1 | 8/2016 |
| EP | 3053616 A1 | 8/2016 |
| EP | 3054352 A1 | 8/2016 |
| EP | 3061465 A1 | 8/2016 |
| EP | 1674537 B1 | 9/2016 |
| EP | 2223751 B1 | 9/2016 |
| EP | 2732329 B1 | 9/2016 |
| EP | 2054099 B1 | 11/2016 |
| EP | 2248112 B1 | 12/2016 |
| EP | 2908867 B1 | 12/2016 |
| EP | 2419475 B1 | 1/2017 |
| EP | 2810257 B1 | 1/2017 |
| EP | 3120874 A1 | 1/2017 |
| EP | 2388239 B1 | 2/2017 |
| EP | 2419223 B1 | 2/2017 |
| EP | 2900443 B1 | 2/2017 |
| EP | 2999667 B1 | 2/2017 |
| EP | 2999669 B1 | 2/2017 |
| EP | 3124261 A1 | 2/2017 |
| EP | 1812241 B1 | 3/2017 |
| EP | 2175923 B1 | 3/2017 |
| EP | 2325011 B1 | 3/2017 |
| EP | 2571536 B1 | 3/2017 |
| EP | 2845732 B1 | 3/2017 |
| EP | 2986566 B1 | 3/2017 |
| EP | 3027966 B1 | 3/2017 |
| EP | 1627256 B1 | 4/2017 |
| EP | 2192163 B1 | 4/2017 |
| EP | 2794496 B1 | 4/2017 |
| EP | 2946939 B1 | 4/2017 |
| EP | 3151204 A1 | 4/2017 |
| EP | 2571538 B1 | 5/2017 |
| EP | 2734370 B1 | 5/2017 |
| EP | 3165123 A1 | 5/2017 |
| EP | 3170796 A1 | 5/2017 |
| EP | 2683415 B1 | 6/2017 |
| WO | WO 00/32982 A1 | 6/2000 |
| WO | WO 00/47977 A1 | 8/2000 |
| WO | WO 01/28006 A2 | 4/2001 |
| WO | WO 01/29542 A1 | 4/2001 |
| WO | WO 01/53801 A2 | 7/2001 |
| WO | WO 01/59717 A1 | 8/2001 |
| WO | WO 01/62672 A1 | 8/2001 |
| WO | WO 02/12127 A2 | 2/2002 |
| WO | WO 02/41264 A1 | 5/2002 |
| WO | WO 02/42795 A1 | 5/2002 |
| WO | WO 02/46748 A2 | 6/2002 |
| WO | WO 02/075286 A1 | 9/2002 |
| WO | WO 03/002187 A2 | 1/2003 |
| WO | WO 03/004929 A1 | 1/2003 |
| WO | WO 03/060495 A1 | 7/2003 |
| WO | WO 03/066245 A1 | 8/2003 |
| WO | WO 03/084601 A2 | 10/2003 |
| WO | WO 03/085608 A2 | 10/2003 |
| WO | WO 03/092746 A1 | 11/2003 |
| WO | WO 03/094374 A1 | 11/2003 |
| WO | WO 2004/000371 A2 | 12/2003 |
| WO | WO 2004/003601 A2 | 1/2004 |
| WO | WO 2004/029568 A1 | 4/2004 |
| WO | WO 2004/031706 A1 | 4/2004 |
| WO | WO 2004/032572 A2 | 4/2004 |

(56) References Cited

FOREIGN PATENT DOCUMENTS

| | | |
|---|---|---|
| WO | WO 2004/048947 A1 | 6/2004 |
| WO | WO 2004/053469 A1 | 6/2004 |
| WO | WO 2004/056581 A1 | 7/2004 |
| WO | WO 2004/075984 A1 | 9/2004 |
| WO | WO 2004/075985 A2 | 9/2004 |
| WO | WO 2004/081475 A2 | 9/2004 |
| WO | WO 2004/096074 A2 | 11/2004 |
| WO | WO 2004/096296 A1 | 11/2004 |
| WO | WO 2004/105859 A2 | 12/2004 |
| WO | WO 2004/109263 A1 | 12/2004 |
| WO | WO 2004/112467 A1 | 12/2004 |
| WO | WO 2004/113881 A1 | 12/2004 |
| WO | WO 2005/006025 A2 | 1/2005 |
| WO | WO 2005/009483 A2 | 2/2005 |
| WO | WO 2005/010564 A2 | 2/2005 |
| WO | WO 2005/012997 A2 | 2/2005 |
| WO | WO 2005/018475 A2 | 3/2005 |
| WO | WO 2005/025642 A2 | 3/2005 |
| WO | WO 2005/031881 A2 | 4/2005 |
| WO | WO 2005/032827 A1 | 4/2005 |
| WO | WO 2005/034851 A2 | 4/2005 |
| WO | WO 2005/038337 A2 | 4/2005 |
| WO | WO 2005/057505 A1 | 6/2005 |
| WO | WO 2005/067566 A2 | 7/2005 |
| WO | WO 2005/068508 A1 | 7/2005 |
| WO | WO 2005/068509 A1 | 7/2005 |
| WO | WO 2005/068510 A1 | 7/2005 |
| WO | WO 2005/068511 A1 | 7/2005 |
| WO | WO 2005/086846 A2 | 9/2005 |
| WO | WO 2005/100956 A1 | 10/2005 |
| WO | WO 2005/116089 A1 | 12/2005 |
| WO | WO 2006/024038 A2 | 3/2006 |
| WO | WO 2006/041670 A2 | 4/2006 |
| WO | WO 2006/044861 A2 | 4/2006 |
| WO | WO 2006/047866 A1 | 5/2006 |
| WO | WO 2006/051542 A1 | 5/2006 |
| WO | WO 2006/068677 A1 | 6/2006 |
| WO | WO 2006/068871 A2 | 6/2006 |
| WO | WO 2006/068979 A1 | 6/2006 |
| WO | WO 2006/072886 A1 | 7/2006 |
| WO | WO 2006/096827 A2 | 9/2006 |
| WO | WO 2006/099413 A2 | 9/2006 |
| WO | WO 2006/100303 A2 | 9/2006 |
| WO | WO 2006/101519 A2 | 9/2006 |
| WO | WO 2006/101526 A2 | 9/2006 |
| WO | WO 2006/108093 A2 | 10/2006 |
| WO | WO 2006/109886 A1 | 10/2006 |
| WO | WO 2006/121762 A2 | 11/2006 |
| WO | WO 2006/130302 A2 | 12/2006 |
| WO | WO 2006/130340 A2 | 12/2006 |
| WO | WO 2006/130401 A2 | 12/2006 |
| WO | WO 2006/130635 A1 | 12/2006 |
| WO | WO 2006/134567 A1 | 12/2006 |
| WO | WO 2007/000039 A1 | 1/2007 |
| WO | WO 2007/001364 A2 | 1/2007 |
| WO | WO 2007/006447 A1 | 1/2007 |
| WO | WO 2007/025283 A2 | 3/2007 |
| WO | WO 2007/037852 A1 | 4/2007 |
| WO | WO 2007/043795 A1 | 4/2007 |
| WO | WO 2007/045506 A1 | 4/2007 |
| WO | WO 2007/046035 A1 | 4/2007 |
| WO | WO 2007/046585 A1 | 4/2007 |
| WO | WO 2007/049937 A2 | 5/2007 |
| WO | WO 2007/051276 A1 | 5/2007 |
| WO | WO 2007/054099 A2 | 5/2007 |
| WO | WO 2007/056720 A2 | 5/2007 |
| WO | WO 2007/057520 A1 | 5/2007 |
| WO | WO 2007/061401 A2 | 5/2007 |
| WO | WO 2007/071042 A1 | 6/2007 |
| WO | WO 2007/078302 A1 | 7/2007 |
| WO | WO 2007/078505 A2 | 7/2007 |
| WO | WO 2007/079749 A1 | 7/2007 |
| WO | WO 2007/090049 A1 | 8/2007 |
| WO | WO 2007/095543 A2 | 8/2007 |
| WO | WO 2007/096344 A1 | 8/2007 |
| WO | WO 2007/100839 A2 | 9/2007 |
| WO | WO 2007/103704 A2 | 9/2007 |
| WO | WO 2007/106835 A2 | 9/2007 |
| WO | WO 2007/141688 A1 | 12/2007 |
| WO | WO 2007/143047 A1 | 12/2007 |
| WO | WO 2007/149585 A2 | 12/2007 |
| WO | WO 2008/001242 A2 | 1/2008 |
| WO | WO 2008/002450 A2 | 1/2008 |
| WO | WO 2008/002659 A2 | 1/2008 |
| WO | WO 2008/004847 A1 | 1/2008 |
| WO | WO 2008/013524 A2 | 1/2008 |
| WO | WO 2008/017300 A2 | 2/2008 |
| WO | WO 2008/018725 A1 | 2/2008 |
| WO | WO 2008/034810 A2 | 3/2008 |
| WO | WO 2008/045565 A1 | 4/2008 |
| WO | WO 2008/048612 A2 | 4/2008 |
| WO | WO 2008/052989 A2 | 5/2008 |
| WO | WO 2008/066519 A1 | 6/2008 |
| WO | WO 2008/067816 A2 | 6/2008 |
| WO | WO 2008/067817 A2 | 6/2008 |
| WO | WO 2008/070563 A1 | 6/2008 |
| WO | WO 2008/075069 A1 | 6/2008 |
| WO | WO 2008/083658 A2 | 7/2008 |
| WO | WO 2008/088792 A1 | 7/2008 |
| WO | WO 2008/088795 A1 | 7/2008 |
| WO | WO 2008/088814 A2 | 7/2008 |
| WO | WO 2008/088853 A1 | 7/2008 |
| WO | WO 2008/091359 A2 | 7/2008 |
| WO | WO 2008/105893 A2 | 9/2008 |
| WO | WO 2008/111754 A1 | 9/2008 |
| WO | WO 2008/120005 A1 | 10/2008 |
| WO | WO 2008/126989 A1 | 10/2008 |
| WO | WO 2008/134485 A1 | 11/2008 |
| WO | WO 2008/136958 A1 | 11/2008 |
| WO | WO 2008/137976 A1 | 11/2008 |
| WO | WO 2008/144922 A1 | 12/2008 |
| WO | WO 2008/151414 A1 | 12/2008 |
| WO | WO 2008/156462 A1 | 12/2008 |
| WO | WO 2009/005265 A2 | 1/2009 |
| WO | WO 2009/006381 A1 | 1/2009 |
| WO | WO 2009/006702 A1 | 1/2009 |
| WO | WO 2009/012752 A1 | 1/2009 |
| WO | WO 2009/013507 A1 | 1/2009 |
| WO | WO 2009/019387 A2 | 2/2009 |
| WO | WO 2009/019388 A1 | 2/2009 |
| WO | WO 2009/024155 A1 | 2/2009 |
| WO | WO 2009/040387 A2 | 4/2009 |
| WO | WO 2009/042159 A2 | 4/2009 |
| WO | WO 2009/045724 A1 | 4/2009 |
| WO | WO 2009/053311 A2 | 4/2009 |
| WO | WO 2009/066231 A2 | 5/2009 |
| WO | WO 2009/091274 A2 | 7/2009 |
| WO | WO 2009/115774 A2 | 9/2009 |
| WO | WO 2009/144520 A1 | 12/2009 |
| WO | WO 2009/144629 A1 | 12/2009 |
| WO | WO 2009/152113 A2 | 12/2009 |
| WO | WO 2010/002501 A2 | 1/2010 |
| WO | WO 2010/002554 A1 | 1/2010 |
| WO | WO 2010/015509 A1 | 2/2010 |
| WO | WO 2010/036423 A1 | 4/2010 |
| WO | WO 2010/036617 A1 | 4/2010 |
| WO | WO 2010/037717 A1 | 4/2010 |
| WO | WO 2010/040557 A1 | 4/2010 |
| WO | WO 2010/041036 A1 | 4/2010 |
| WO | WO 2010/042141 A2 | 4/2010 |
| WO | WO 2010/042635 A1 | 4/2010 |
| WO | WO 2010/047672 A1 | 4/2010 |
| WO | WO 2010/057081 A1 | 5/2010 |
| WO | WO 2010/060079 A1 | 5/2010 |
| WO | WO 2010/062657 A2 | 6/2010 |
| WO | WO 2010/071814 A1 | 6/2010 |
| WO | WO 2010/080928 A1 | 7/2010 |
| WO | WO 2010/081507 A1 | 7/2010 |
| WO | WO 2010/088114 A1 | 8/2010 |
| WO | WO 2010/088376 A1 | 8/2010 |
| WO | WO 2010/094801 A1 | 8/2010 |
| WO | WO 2010/096074 A1 | 8/2010 |
| WO | WO 2010/098761 A1 | 9/2010 |
| WO | WO 2010/098848 A2 | 9/2010 |

(56) References Cited

FOREIGN PATENT DOCUMENTS

| | | |
|---|---|---|
| WO | WO 2010/105365 A1 | 9/2010 |
| WO | WO 2010/111082 A1 | 9/2010 |
| WO | WO 2010/111121 A1 | 9/2010 |
| WO | WO 2010/115183 A1 | 10/2010 |
| WO | WO 2010/129557 A1 | 11/2010 |
| WO | WO 2010/151657 A1 | 12/2010 |
| WO | WO 2011/004611 A1 | 1/2011 |
| WO | WO 2011/025997 A2 | 3/2011 |
| WO | WO 2011/031167 A1 | 3/2011 |
| WO | WO 2011/031527 A1 | 3/2011 |
| WO | WO 2011/033263 A1 | 3/2011 |
| WO | WO 2011/033329 A1 | 3/2011 |
| WO | WO 2011/034678 A1 | 3/2011 |
| WO | WO 2011/034947 A2 | 3/2011 |
| WO | WO 2011/044589 A2 | 4/2011 |
| WO | WO 2011/051399 A1 | 5/2011 |
| WO | WO 2011/055133 A2 | 5/2011 |
| WO | WO 2011/055246 A1 | 5/2011 |
| WO | WO 2011/058048 A1 | 5/2011 |
| WO | WO 2011/063252 A2 | 5/2011 |
| WO | WO 2011/072087 A1 | 6/2011 |
| WO | WO 2011/077203 A2 | 6/2011 |
| WO | WO 2011/079108 A1 | 6/2011 |
| WO | WO 2011/107540 A1 | 6/2011 |
| WO | WO 2011/083378 A1 | 7/2011 |
| WO | WO 2011/083381 A1 | 7/2011 |
| WO | WO 2011/094293 A1 | 8/2011 |
| WO | WO 2011/101269 A1 | 8/2011 |
| WO | WO 2011/117841 A1 | 9/2011 |
| WO | WO 2011/121222 A1 | 10/2011 |
| WO | WO 2011/142914 A1 | 11/2011 |
| WO | WO 2011/153388 A2 | 12/2011 |
| WO | WO 2011/159152 A1 | 12/2011 |
| WO | WO 2012/006199 A1 | 1/2012 |
| WO | WO 2012/006200 A1 | 1/2012 |
| WO | WO 2012/009552 A1 | 1/2012 |
| WO | WO 2012/021051 A1 | 2/2012 |
| WO | WO 2012/027084 A2 | 3/2012 |
| WO | WO 2012/030589 A2 | 3/2012 |
| WO | WO 2012/038531 A1 | 3/2012 |
| WO | WO 2012/044325 A1 | 4/2012 |
| WO | WO 2012/052905 A1 | 4/2012 |
| WO | WO 2012/057819 A2 | 5/2012 |
| WO | WO 2012/063177 A2 | 5/2012 |
| WO | WO 2012/064371 A1 | 5/2012 |
| WO | WO 2012/073241 A1 | 6/2012 |
| WO | WO 2012/078476 A2 | 6/2012 |
| WO | WO 2012/080673 A1 | 6/2012 |
| WO | WO 2012/083028 A1 | 6/2012 |
| WO | WO 2012/083032 A1 | 6/2012 |
| WO | WO 2012/085336 A1 | 6/2012 |
| WO | WO 2012/090011 A1 | 7/2012 |
| WO | WO 2012/101345 A1 | 8/2012 |
| WO | WO 2012/114241 A2 | 8/2012 |
| WO | WO 2012/149992 A1 | 11/2012 |
| WO | WO 2012/151204 A1 | 11/2012 |
| WO | WO 2012/154275 A1 | 11/2012 |
| WO | WO 2012/156144 A1 | 11/2012 |
| WO | WO 2012/160002 A1 | 11/2012 |
| WO | WO 2012/168539 A1 | 12/2012 |
| WO | WO 2012/174238 A2 | 12/2012 |
| WO | WO 2012/177803 A1 | 12/2012 |
| WO | WO 2013/001485 A1 | 1/2013 |
| WO | WO 2013/006480 A1 | 1/2013 |
| WO | WO 2013/009321 A1 | 1/2013 |
| WO | WO 2013/028831 A1 | 2/2013 |
| WO | WO 2013/032599 A1 | 3/2013 |
| WO | WO 2013/033255 A2 | 3/2013 |
| WO | WO 2013/040582 A2 | 3/2013 |
| WO | WO 2013/043732 A1 | 3/2013 |
| WO | WO 2013/073955 A1 | 3/2013 |
| WO | WO 2013/049491 A1 | 4/2013 |
| WO | WO 2013/055772 A1 | 4/2013 |
| WO | WO 2013/056928 A1 | 4/2013 |
| WO | WO 2013/061007 A2 | 5/2013 |
| WO | WO 2013/064154 A1 | 5/2013 |
| WO | WO 2013/067052 A1 | 5/2013 |
| WO | WO 2013/078297 A1 | 5/2013 |
| WO | WO 2013/086274 A1 | 6/2013 |
| WO | WO 2013/090004 A1 | 6/2013 |
| WO | WO 2013/092879 A1 | 6/2013 |
| WO | WO 2013/103441 A2 | 7/2013 |
| WO | WO 2013/107733 A1 | 7/2013 |
| WO | WO 2013/112752 A1 | 8/2013 |
| WO | WO 2013/126896 A1 | 8/2013 |
| WO | WO 2013/132369 A1 | 9/2013 |
| WO | WO 2013/137657 A1 | 9/2013 |
| WO | WO 2013/138449 A1 | 9/2013 |
| WO | WO 2013/139851 A1 | 9/2013 |
| WO | WO 2013/144679 A2 | 10/2013 |
| WO | WO 2013/150388 A2 | 10/2013 |
| WO | WO 2013/158507 A1 | 10/2013 |
| WO | WO 2013/162728 A1 | 10/2013 |
| WO | WO 2013/175223 A2 | 11/2013 |
| WO | WO 2013/176736 A1 | 11/2013 |
| WO | WO 2013/181393 A1 | 12/2013 |
| WO | WO 2013/188098 A1 | 12/2013 |
| WO | WO 2014/003446 A1 | 1/2014 |
| WO | WO 2014/009939 A1 | 1/2014 |
| WO | WO 2014/011261 A2 | 1/2014 |
| WO | WO 2014/014779 A1 | 1/2014 |
| WO | WO 2014/014865 A1 | 1/2014 |
| WO | WO 2014/015420 A1 | 1/2014 |
| WO | WO 2014/144679 A1 | 1/2014 |
| WO | WO 2014/035343 A1 | 3/2014 |
| WO | WO 2014/036083 A1 | 3/2014 |
| WO | WO 2014/051906 A1 | 4/2014 |
| WO | WO 2014/056573 A2 | 4/2014 |
| WO | WO 2014/059395 A1 | 4/2014 |
| WO | WO 2014/074608 A1 | 5/2014 |
| WO | WO 2014/088298 A1 | 6/2014 |
| WO | WO 2014/089041 A2 | 6/2014 |
| WO | WO 2014/092802 A1 | 6/2014 |
| WO | WO 2014/094965 A2 | 6/2014 |
| WO | WO 2014/095864 A1 | 6/2014 |
| WO | WO 2014/100241 A1 | 6/2014 |
| WO | WO 2014/100745 A1 | 6/2014 |
| WO | WO 2014/104661 A1 | 7/2014 |
| WO | WO 2014/104796 A1 | 7/2014 |
| WO | WO 2014/106520 A1 | 7/2014 |
| WO | WO 2014/113917 A1 | 7/2014 |
| WO | WO 2014/114243 A1 | 7/2014 |
| WO | WO 2014/115146 A1 | 7/2014 |
| WO | WO 2014/116065 A1 | 7/2014 |
| WO | WO 2014/116066 A1 | 7/2014 |
| WO | WO 2014/120620 A1 | 8/2014 |
| WO | WO 2014/122593 A1 | 8/2014 |
| WO | WO 2014/126578 A1 | 8/2014 |
| WO | WO 2014/128180 A1 | 8/2014 |
| WO | WO 2014/130362 A1 | 8/2014 |
| WO | WO 2014/138262 A1 | 9/2014 |
| WO | WO 2014/142452 A1 | 9/2014 |
| WO | WO 2014/142493 A1 | 9/2014 |
| WO | WO 2014/143882 A1 | 9/2014 |
| WO | WO 2014/144304 A1 | 9/2014 |
| WO | WO 2014/149545 A1 | 9/2014 |
| WO | WO 2014/153282 A1 | 9/2014 |
| WO | WO 2014/158863 A1 | 10/2014 |
| WO | WO 2014/160366 A1 | 10/2014 |
| WO | WO 2014/160778 A1 | 10/2014 |
| WO | WO 2014/165854 A1 | 10/2014 |
| WO | WO 2014/170515 A1 | 10/2014 |
| WO | WO 2014/177837 A1 | 11/2014 |
| WO | WO 2014/182439 A1 | 11/2014 |
| WO | WO 2014/184038 A1 | 11/2014 |
| WO | WO 2014/184337 A1 | 11/2014 |
| WO | WO 2014/188347 A1 | 11/2014 |
| WO | WO 2014/193252 A1 | 12/2014 |
| WO | WO 2014/201469 A1 | 12/2014 |
| WO | WO 2014/205366 A1 | 12/2014 |
| WO | WO 2015/000092 A1 | 1/2015 |
| WO | WO 2015/010984 A1 | 1/2015 |
| WO | WO 2015/012592 A1 | 1/2015 |
| WO | WO 2015/013309 A1 | 1/2015 |

(56) References Cited

FOREIGN PATENT DOCUMENTS

| | | |
|---|---|---|
| WO | WO 2015/013586 A2 | 1/2015 |
| WO | WO 2015/021506 A1 | 2/2015 |
| WO | WO 2015/023487 A1 | 2/2015 |
| WO | WO 2015/031322 A1 | 3/2015 |
| WO | WO 2015/031446 A1 | 3/2015 |
| WO | WO 2015/031492 A1 | 3/2015 |
| WO | WO 2015/031739 A1 | 3/2015 |
| WO | WO 2015/031785 A1 | 3/2015 |
| WO | WO 2015/047705 A1 | 4/2015 |
| WO | WO 2015/055437 A1 | 4/2015 |
| WO | WO 2015/059336 A1 | 4/2015 |
| WO | WO 2015/061406 A1 | 4/2015 |
| WO | WO 2015/061773 A1 | 4/2015 |
| WO | WO 2015/062648 A1 | 5/2015 |
| WO | WO 2015/069680 A1 | 5/2015 |
| WO | WO 2015/083089 A2 | 6/2015 |
| WO | WO 2015/084943 A1 | 6/2015 |
| WO | WO 2015/089603 A1 | 6/2015 |
| WO | WO 2015/095363 A1 | 6/2015 |
| WO | WO 2015/095408 A1 | 6/2015 |
| WO | WO 2015/102328 A1 | 7/2015 |
| WO | WO 2015/104133 A1 | 7/2015 |
| WO | WO 2015/112454 A1 | 7/2015 |
| WO | WO 2015/116833 A1 | 8/2015 |
| WO | WO 2015/123141 A1 | 8/2015 |
| WO | WO 2015/133968 A1 | 9/2015 |
| WO | WO 2015/137825 A1 | 9/2015 |
| WO | WO 2015/140382 A1 | 9/2015 |
| WO | WO 2015/142720 A1 | 9/2015 |
| WO | WO 2015/150226 A1 | 10/2015 |
| WO | WO 2015/157178 A1 | 10/2015 |
| WO | WO 2015/157662 A1 | 10/2015 |
| WO | WO 2015/161086 A1 | 10/2015 |
| WO | WO 2015/172867 A1 | 11/2015 |
| WO | WO 2015/175274 A1 | 11/2015 |
| WO | WO 2015/176960 A1 | 11/2015 |
| WO | WO 2015/179871 A1 | 11/2015 |
| WO | WO 2015/184142 A1 | 12/2015 |
| WO | WO 2015/184336 A1 | 12/2015 |
| WO | WO 2015/189578 A1 | 12/2015 |
| WO | WO 2016/000980 A1 | 1/2016 |
| WO | WO 2016/001689 A1 | 1/2016 |
| WO | WO 2016/001776 A1 | 1/2016 |
| WO | WO 2016/003604 A1 | 1/2016 |
| WO | WO 2016/004205 A2 | 1/2016 |
| WO | WO 2016/007798 A2 | 1/2016 |
| WO | WO 2016/008803 A1 | 1/2016 |
| WO | WO 2016/008806 A1 | 1/2016 |
| WO | WO 2016/008807 A1 | 1/2016 |
| WO | WO 2016/014617 A1 | 1/2016 |
| WO | WO 2016/016603 A1 | 2/2016 |
| WO | WO 2016/018545 A1 | 2/2016 |
| WO | WO 2016/025957 A1 | 2/2016 |
| WO | WO 2016/028966 A1 | 2/2016 |
| WO | WO 2016/033350 A1 | 3/2016 |
| WO | WO 2016/043991 A1 | 3/2016 |
| WO | WO 2016/049447 A1 | 3/2016 |
| WO | WO 2016/050862 A1 | 4/2016 |
| WO | WO 2016/052885 A1 | 4/2016 |
| WO | WO 2016/054150 A1 | 4/2016 |
| WO | WO 2016/058015 A1 | 4/2016 |
| WO | WO 2016/064945 A1 | 4/2016 |
| WO | WO 2016/067247 A1 | 5/2016 |
| WO | WO 2016/072774 A1 | 5/2016 |
| WO | WO 2016/074041 A1 | 5/2016 |
| WO | WO 2016/075640 A1 | 5/2016 |
| WO | WO 2016/081959 A2 | 5/2016 |
| WO | WO 2016/085171 A1 | 6/2016 |
| WO | WO 2016/089088 A1 | 6/2016 |
| WO | WO 2016/093677 A1 | 6/2016 |
| WO | WO 2016/108459 A1 | 7/2016 |
| WO | WO 2016/124521 A1 | 8/2016 |
| WO | WO 2016/127115 A1 | 8/2016 |
| WO | WO 2016/141104 A1 | 9/2016 |
| WO | WO 2016/144157 A2 | 9/2016 |
| WO | WO 2016/144839 A1 | 9/2016 |
| WO | WO 2016/147191 A1 | 9/2016 |
| WO | WO 2016/148341 A1 | 9/2016 |
| WO | WO 2016/148920 A1 | 9/2016 |
| WO | WO 2016/150718 A1 | 9/2016 |
| WO | WO 2016/150867 A1 | 9/2016 |
| WO | WO 2016/154570 A1 | 9/2016 |
| WO | WO 2016/160301 A1 | 10/2016 |
| WO | WO 2016/162581 A1 | 10/2016 |
| WO | WO 2016/162858 A1 | 10/2016 |
| WO | WO 2016/164849 A1 | 10/2016 |
| WO | WO 2016/164897 A1 | 10/2016 |
| WO | WO 2016/179118 A1 | 11/2016 |
| WO | WO 2016/179193 A1 | 11/2016 |
| WO | WO 2016/179198 A1 | 11/2016 |
| WO | WO 2016/180388 A1 | 11/2016 |
| WO | WO 2016/184775 A1 | 11/2016 |
| WO | WO 2016/186878 A1 | 11/2016 |
| WO | WO 2016/205537 A1 | 12/2016 |
| WO | WO 2017/003347 A1 | 1/2017 |
| WO | WO 2017/009099 A1 | 1/2017 |
| WO | WO 2017/011612 A1 | 1/2017 |
| WO | WO 2017/012644 A1 | 1/2017 |
| WO | WO 2017/021504 A1 | 2/2017 |
| WO | WO 2017/027399 A1 | 2/2017 |
| WO | WO 2017/035129 A1 | 3/2017 |
| WO | WO 2017/041825 A1 | 3/2017 |
| WO | WO 2017/041982 A2 | 3/2017 |
| WO | WO 2017/042662 A1 | 3/2017 |
| WO | WO 2017/045662 A1 | 3/2017 |
| WO | WO 2017/046249 A1 | 3/2017 |
| WO | WO 2017/046389 A1 | 3/2017 |
| WO | WO 2017/048870 A1 | 3/2017 |
| WO | WO 2017/048877 A1 | 3/2017 |
| WO | WO 2017/055093 A1 | 4/2017 |
| WO | WO 2017/055203 A1 | 4/2017 |
| WO | WO 2017/060088 A1 | 4/2017 |
| WO | WO 2017/062771 A1 | 4/2017 |
| WO | WO 2017/070359 A1 | 4/2017 |
| WO | WO 2017/078742 A1 | 5/2017 |
| WO | WO 2017/087077 A1 | 5/2017 |

\* cited by examiner

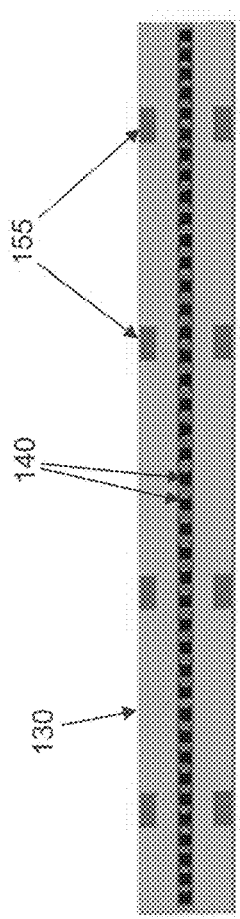
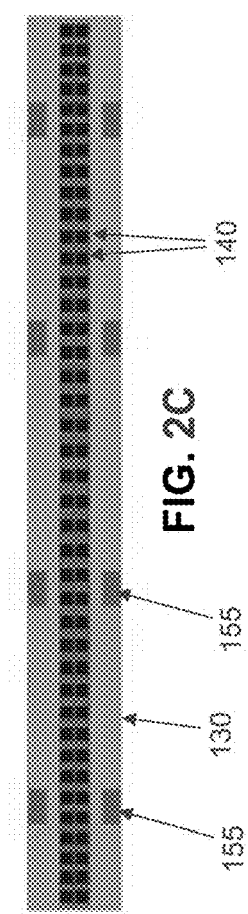
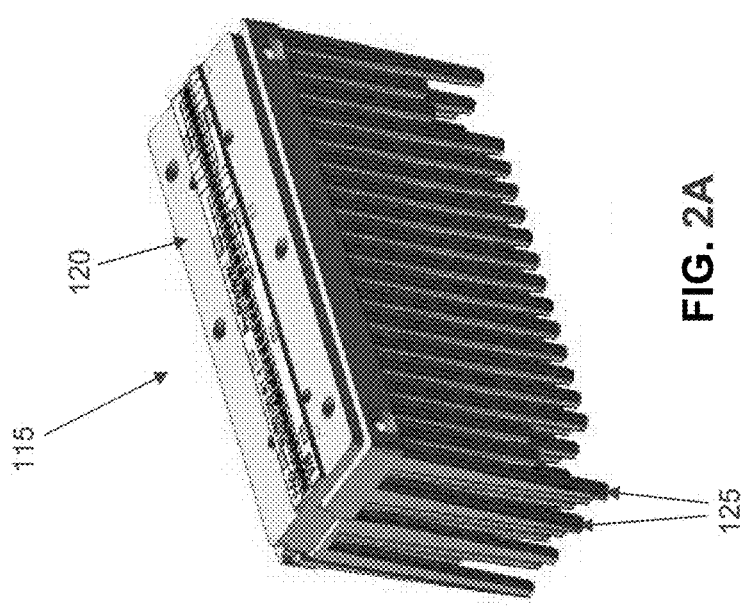
FIG. 2B
FIG. 2C
FIG. 2A

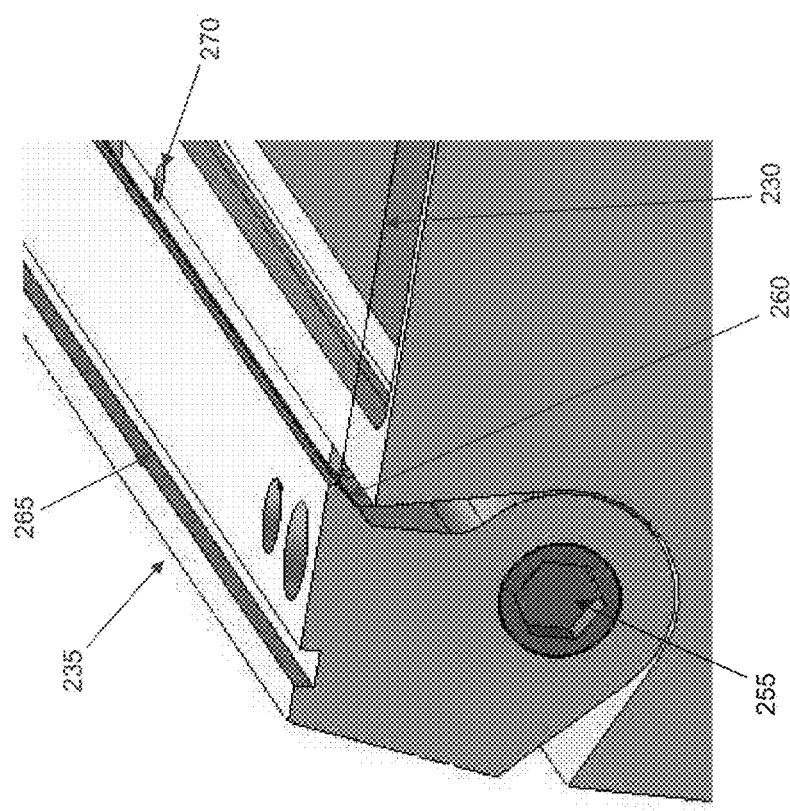
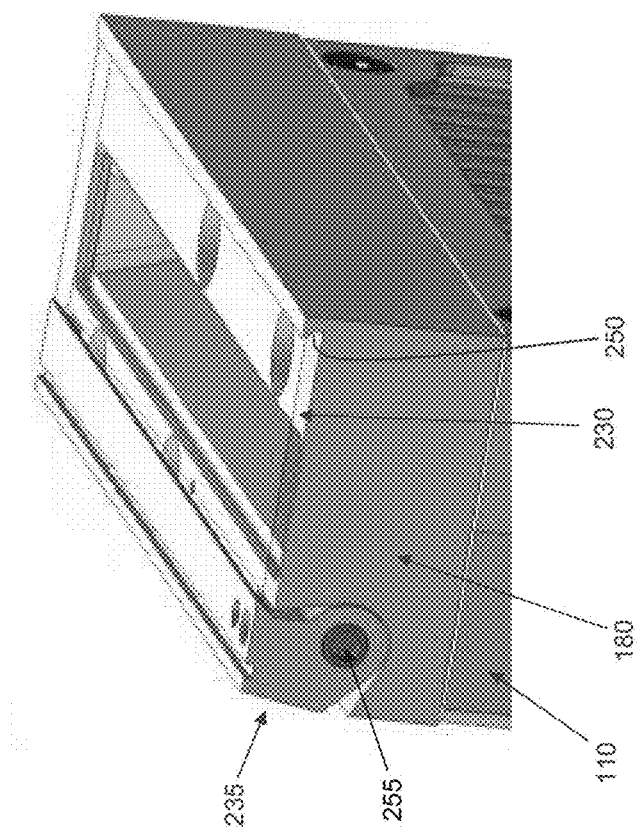
FIG. 8B
FIG. 8A

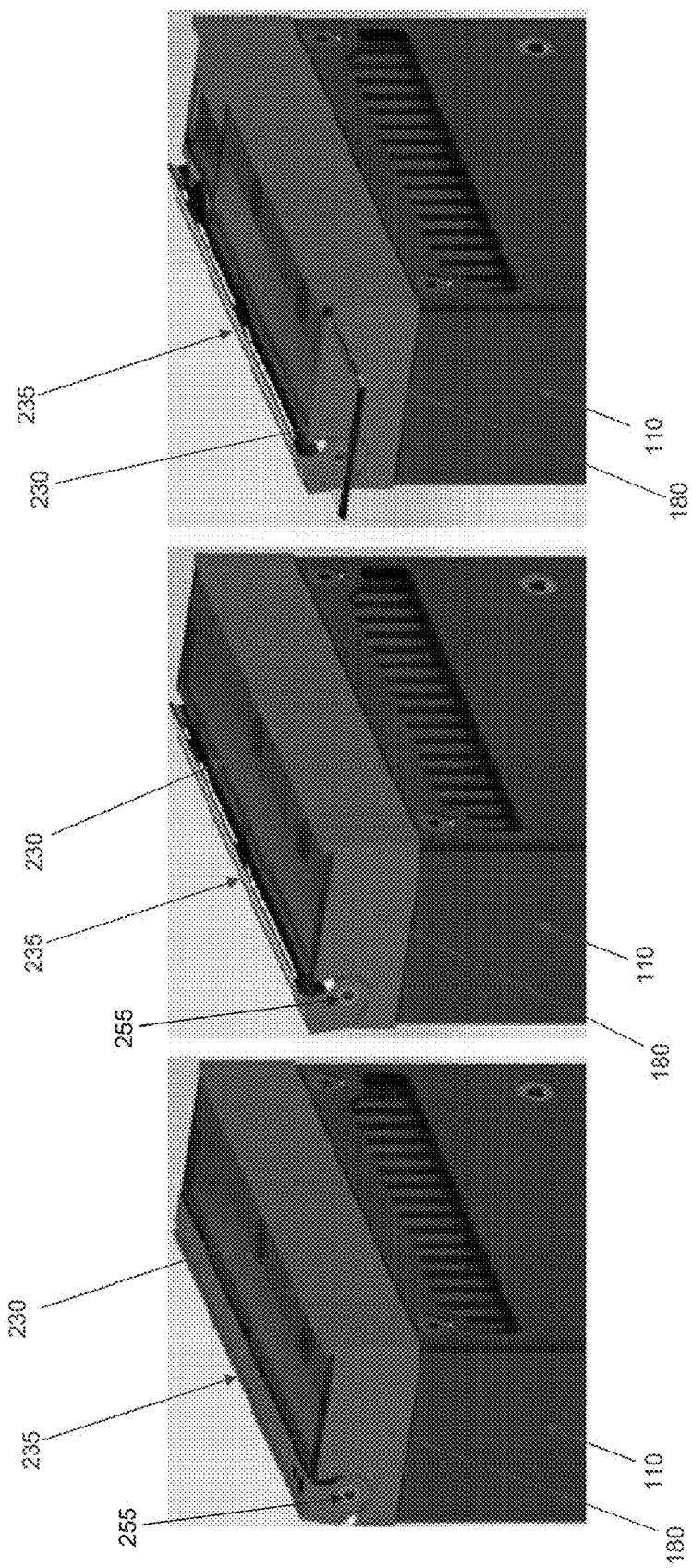

LED LAMP WITH SENSING CAPABILITIES

REFERENCE TO PENDING PRIOR PATENT APPLICATION

This patent application claims benefit of prior U.S. Provisional Patent Application Ser. No. 62/213,443, filed Sep. 2, 2015 by ProPhotonix Limited and Karol Murphy et al. for LED LAMP WITH SENSING CAPABILITIES, which patent application, is hereby incorporated herein by reference.

FIELD OF THE INVENTION

This invention relates to lighting devices in general, and more particularly to a novel LED lamp which comprises novel sensing elements to manage the real-time operation of the LED lamp and a novel mechanism enabling easy replacement of an outer (exit) window of the LED lamp.

BACKGROUND OF THE INVENTION

LED illumination offers significant benefits over traditional lamp technologies including, but not limited to, longer illuminator lifetimes, more stable light output over illuminator lifetimes, ozone-free output, more precise lighting control, better thermal management to keep heat from the target object and lower cost.

Visible- and IR-wavelength LED lamps for machine vision applications are sometimes used in dusty and/or chemically reactive environments. Recently, UV LED lamps have found use as an alternative technology to traditional lamps for curing applications. Inks, adhesives, polymers and coatings are often cured using UV light for printing, manufacturing and 3D printing applications. In certain environments, a build-up of material can form on the outer (exit) window of the lamp over time, resulting in a reduction in the intensity of light emitted by the lamp. By way of example, in printing applications, ink can build up over time on the outer (exit) window of the lamp and cure on the outer surface of the outer (exit) window. By way of further example, in the lamps used in optical sorting systems, layers of dirt or dust can form on the outer (exit) window of the lamp, leading to a reduction in intensity of the light emitted by the lamp.

Users typically address these issues by shutting down their systems and scraping (i.e., manually removing) the built-up material from the outer (exit) window of the lamp. This solution is not ideal, inasmuch as such scraping of the outer (exit) window of the lamp often results in a permanently scratched outer (exit) window which can affect the optical output profile of the lamp. Another solution which is sometimes used by users is to remove the outer (exit) window from the lamp (which may require the entire lamp to be removed from a production line) and then immerse the outer (exit) window in a chemical solution to remove the built-up material. This chemical cleaning method can take up to an hour to complete for some materials, for example, inks which are fully cured on a surface of a glass window. In commercial environments where down-time of systems incorporating LED lamps needs to be minimized, it would be desirable to provide a secure, but easily replaceable, outer (exit) window to facilitate ease of removal and cleaning, or outright replacement, of the outer (exit) window. It would be preferable if the outer (exit) window did not require screws (or similar tool-installed fasteners) in order to be secured to the remainder of the lamp, and could be easily changed by non-technical personnel working without tools (e.g., screwdrivers, Allen wrenches and the like).

Machine vision and UV-curing applications are very sensitive to changes in light intensity and uniformity. In general, for machine vision applications, the brighter the light, the faster the machine vision system can operate, and the better the machine vision system will perform. In UV-curing applications, it is very important to maintain the intensity and uniformity of the light at the user's specifications in order to ensure that the material being cured is cured to the appropriate level. Furthermore, it is important to notify the user when the intensity and uniformity of the light varies from the user's specifications. For this reason, a sensor detecting excessive build-up of material on the outer (exit) window surface of the lamp would be very useful.

Therefore, it would be desirable to provide a replaceable window system on an LED lamp that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

SUMMARY OF THE INVENTION

The present invention comprises a novel LED lamp comprising a replaceable window system that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

In one preferred form of the present invention, there is provided a novel LED lamp comprising:
  a lamp body;
  an LED mounted to the lamp body;
  an outer (exit) window; and
  a hinged clamp for releasably mounting the outer (exit) window to the lamp body such that light emitted from the LED passes through the outer (exit) window.

In another preferred form of the present invention, there is provided a novel method for producing light, the novel method comprising:
  providing a novel LED lamp comprising:
    a lamp body;
    an LED mounted to the lamp body;
    an outer (exit) window; and
    a hinged clamp for releasably mounting the outer (exit) window to the lamp body such that light emitted from the LED passes through the outer (exit) window; and
  driving the LED so that it emits light.

In another preferred form of the present invention, there is provided a novel LED lamp comprising:
  a lamp body;
  an LED mounted to the lamp body;
  an outer (exit) window comprising an edge surface;
  a photodetector; and
  a light pipe for transmitting light from the edge surface of the outer (exit) window to the photodetector.

In another preferred form of the present invention, there is provided a novel method for producing light, the novel method comprising:
  providing a novel LED lamp comprising:
    a lamp body;
    an LED mounted to the lamp body;
    an outer (exit) window comprising an edge surface;
    a photodetector; and
    a light pipe for transmitting light from the edge surface of the outer (exit) window to the photodetector; and
  driving the LED so that it emits light.

In another preferred form of the present invention, there is provided a novel LED lamp comprising:

a lamp body comprising a heat sink having a front surface, a rear surface and a side surface extending between the front surface and the rear surface;

an LED assembly mounted to the front surface of the heat sink, the LED assembly comprising a substrate and a plurality of LEDs mounted to the substrate; and a sensor assembly mounted to the LED assembly and extending from the front surface of the heat sink alongside the side surface of the heat sink, the sensor assembly comprising a flexible polyimide substrate and a plurality of sensing elements mounted to the flexible polyimide substrate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 2A is a schematic view showing a heat sink with an LED substrate attached;

FIG. 2B is a schematic view of an LED substrate formed in accordance with the present invention;

FIG. 2C is a schematic view of another LED substrate formed in accordance with the present invention;

FIGS. 8A and 8B are schematic views showing how a hinged clamp is used to releasably mount a removable outer (exit) window to the reflector;

FIGS. 9A, 9B and 9C are schematic views showing how a removable outer (exit) window is removed from the reflector;

DETAILED DESCRIPTION OF THE PREFERRED EMBODIMENT

The present invention comprises a novel LED lamp comprising a replaceable window system that can be easily removed by non-technical personnel, minimizing the down-time of the lamp and hence minimizing the down-time of the overall system employing the lamp, as well as sensors and software to manage the intensity, uniformity, thermal feedback and lifetime of the lamp, including detecting excessive build-up of material on the outer (exit) window surface of the lamp.

Figure 1:
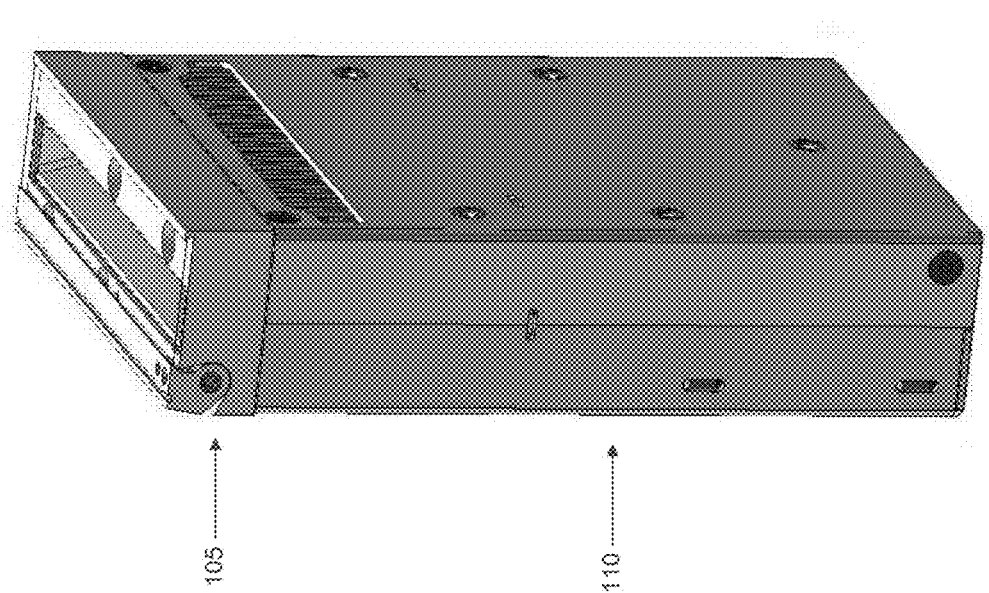
FIG. 1 is a schematic view of a novel LED lamp formed in accordance with the present invention.
Figure 3:
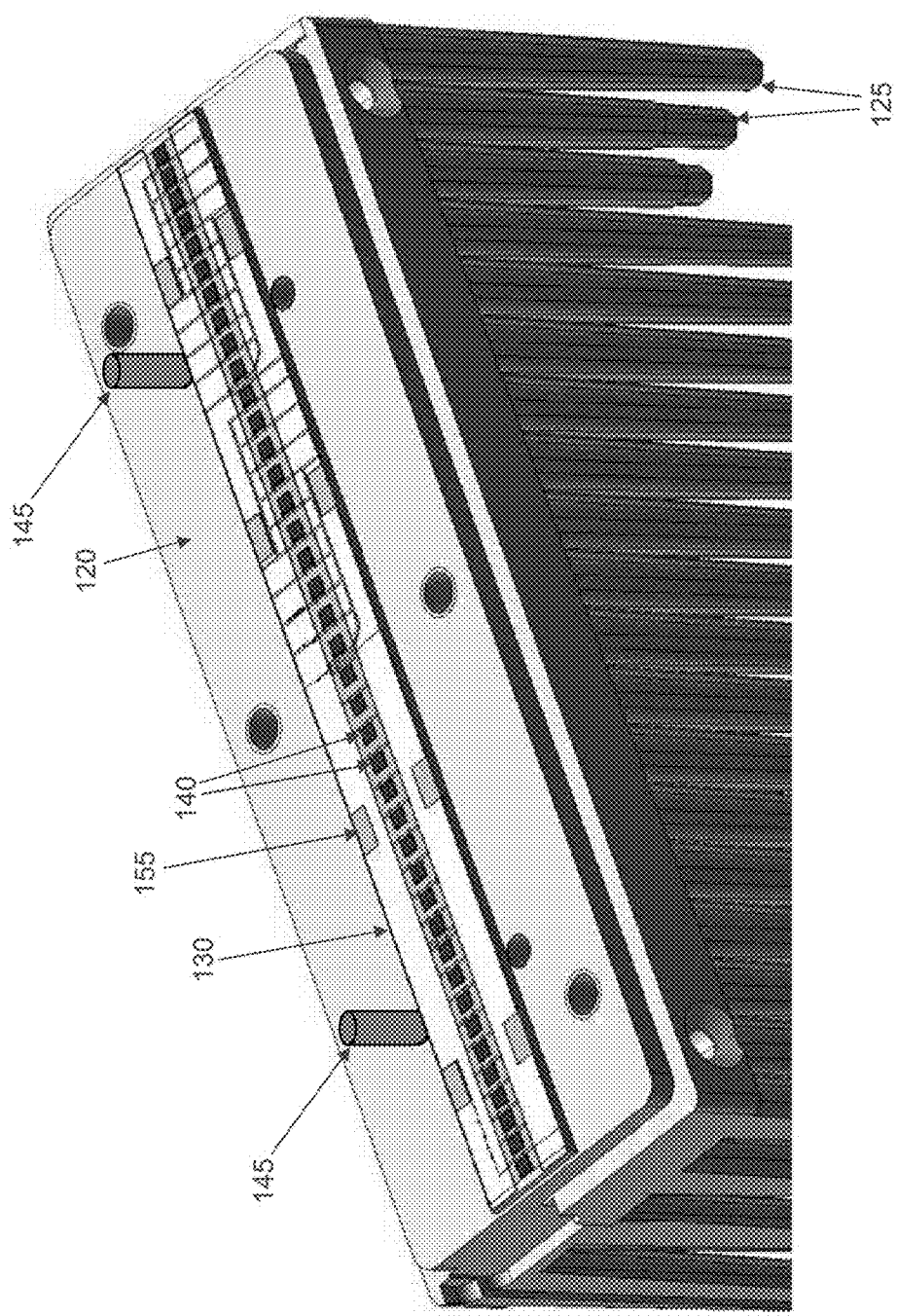
FIG. 3 is another schematic view showing a heat sink with an LED substrate attached.
Figure 4:
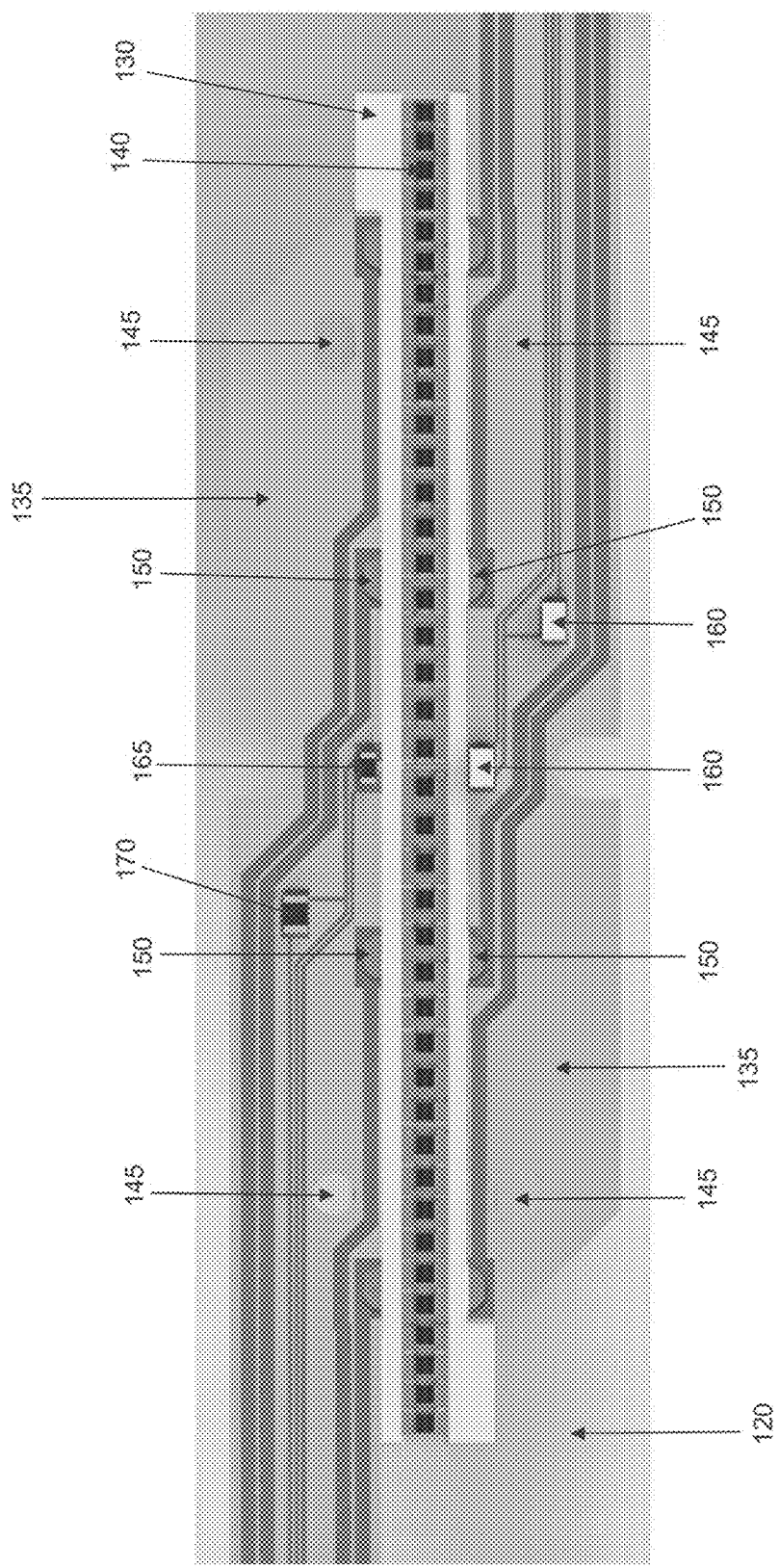
FIG. 4 is a schematic view showing an LED substrate and flexible polyimide connectors mounted to the top of a heat sink.

More particularly, and looking first at FIG. 1, there is shown a novel LED lamp 100 which generally comprises a header section 105 and a housing section 110. LED lamp 100 is designed to be highly configurable according to a user's needs. Header section 105 can be configured with different LEDs, optical and mechanical configurations. Housing section 110 can be configured with different mounting holes, thermal management elements (e.g., heat sink, fan, etc.), printed circuit boards (PCBs), and communication port configurations. In one preferred form of the invention, and looking now at FIG. 2A, the thermal management elements of the lamp comprise a heat sink 115 which comprises an aluminum block 120 with staggered hexagonal pins 125. Those skilled in the art will understand that other heat sink configurations comprising heat-dissipating elements (e.g., finned heat sinks) may be used with the present invention.

Looking next at FIGS. 1-4, header section 105 comprises an LED substrate 130, a flexible polyimide connector 135, various sensing elements (see below), and a reflector (see below), a fixed window (see below), a removable outer (exit) window (see below) and a hinge mechanism (see below). LED substrate 130 comprises LED chips 140 which are placed on the substrate by pick-and-place methods. LED substrate 130 can comprise FR4, IMS, aluminum nitride (ALN) or any other appropriate substrate. LED substrate 130 is preferably glued to heat sink 115 (see FIG. 2A). In the example shown in FIG. 2B, LED substrate 130 consists of 40 LEDs positioned in a "1-D" array across the substrate. However, LEDs can be arranged in alternative configurations such as staggered, hexagonal or multiple linear arrays. More than one LED can be placed on the same bonding pad (see FIG. 2C). The pitch (i.e., spacing) between the LEDs can be varied across the substrate so as to produce a particular light intensity profile. In FIGS. 2B and 2C, the LEDs 140 are shown as being placed further apart at the center of the substrate so as to improve light uniformity along the line of the optical output.

To maximize optical efficiency, it is desirable to place the optical lensing elements (see below) as close to LED substrate 130 as possible so as to maximize capture of the light emitted from the LEDs. In conventional LED-based lamps, a ribbon connector is utilized to connect the LEDs to a driver circuit in order to drive (i.e., energize) the LEDs. This conventional ribbon connector is placed directly on the LED substrate. This type of conventional ribbon connector takes up considerable space, resulting in the optical lensing elements having to be placed further from the LED substrate, thus reducing the optical efficiency of the lamp. Also, such a conventional ribbon connector takes up space that could be utilized for various sensing elements such as thermistors, photodiodes, etc. Furthermore, the connecting wiring extending between such a conventional ribbon connector and the PCB driver circuit (for driving the LEDs) would have to run off the LED substrate down to the PCB, potentially impeding fan cooling of the assembly when the lamp is in use. Finally, the typical LED-based lamp is designed so that the array of LEDs on the LED substrate is driven by a single PCB driver circuit. This limits the precision of the control for the LED array when a large number of LEDs is present. Such a design is also not suitable for multi-wavelength LED arrays where LEDs of different wavelengths may have different operating characteristics.

With the present invention, the electrical connection of LEDs 140 to a PCB driver circuit (located in housing section 110) is achieved using flexible polyimide substrates 135. Two polyimide substrates 135 are guided into their correct positions on aluminum block 120 of heat sink 115 via four dowel pins 145 inserted vertically into the top surface of aluminum block 120 of heat sink 115 (see FIGS. 3 and 4). Flexible polyimide substrates 135 can be attached to the top surface of aluminum block 120 of heat sink 115 by double-sided adhesive tape, glue, thermal pads or by mechanical force, etc.

Flexible polyimide substrates 135 are designed so that their solder pads 150 (FIG. 4) are matched with the solder pads 155 (FIGS. 2B and 2C) on LED substrate 130 so that they can be electrically connected via a soldering process. Each pair of connections between solder pads 150, 155 provides current to a chain of LEDs 140 from their own driver circuit. In the example shown in FIG. 4, there are 4 chains of 10 LEDs each driven by an independent driver circuit located on a PCB located within housing section 110 of LED lamp 100. This design can be scaled up or down to include more or less LED chains and more or less driver circuits. This design can also be used for multi-wavelength configurations (i.e., different driver circuits can be provided for different chains of LEDs, each of which may produce light of different wavelengths). By utilizing a multi-driver design, the balance of the currents associated with smaller LED chains can be controlled more precisely. The thin form factor of flexible polyimide substrates 135 minimizes the connection height and connection paths in the system. Flexible polyimide substrates 135 are designed to run down the sides of the lamp and connect to the PCB (located in housing section 110) via connectors (see below). In this way, flexible polyimide substrates 135 do not obstruct the air flow of the cooling fans when the lamp is in operation.

In addition to providing electrical connection of LEDs 140 to the PCB driver circuits, flexible polyimide substrates 135 also host a number of various sensing elements. In one preferred form of the invention, and looking now at FIG. 4, flexible polyimide substrates 135 comprise two photodiodes 160, a thermistor 165 and a resistor 170. The two photodiodes 160, thermistor 165 and resistor 170 are embedded on flexible polyimide substrates 135, enabling adjustment to correct for LED degradation due to high temperature effects and/or LED aging, whereby to maintain the same light brightness and uniformity over changing conditions. More particularly, thermistor 165 measures the temperature at the surface of a flexible polyimide substrate 135. Resistor 170 on flexible polyimide substrate 135 detects a reverse polarity. The pair of flexible polyimide substrates 135 are designed to support opposite polarity LEDs. If a different polarity is required, the flexible polyimide substrates 135 are simply rotated 180° and switch sides on the top surface of aluminum block 120 of heat sink 115. The first photodiode 160 measures the intensity of the light emitted by LEDs 140 at the surface of LED substrate 130. The second photodiode 160 measures the intensity of the light at the surface of the removable outer (exit) window (see below).

Figure 5:
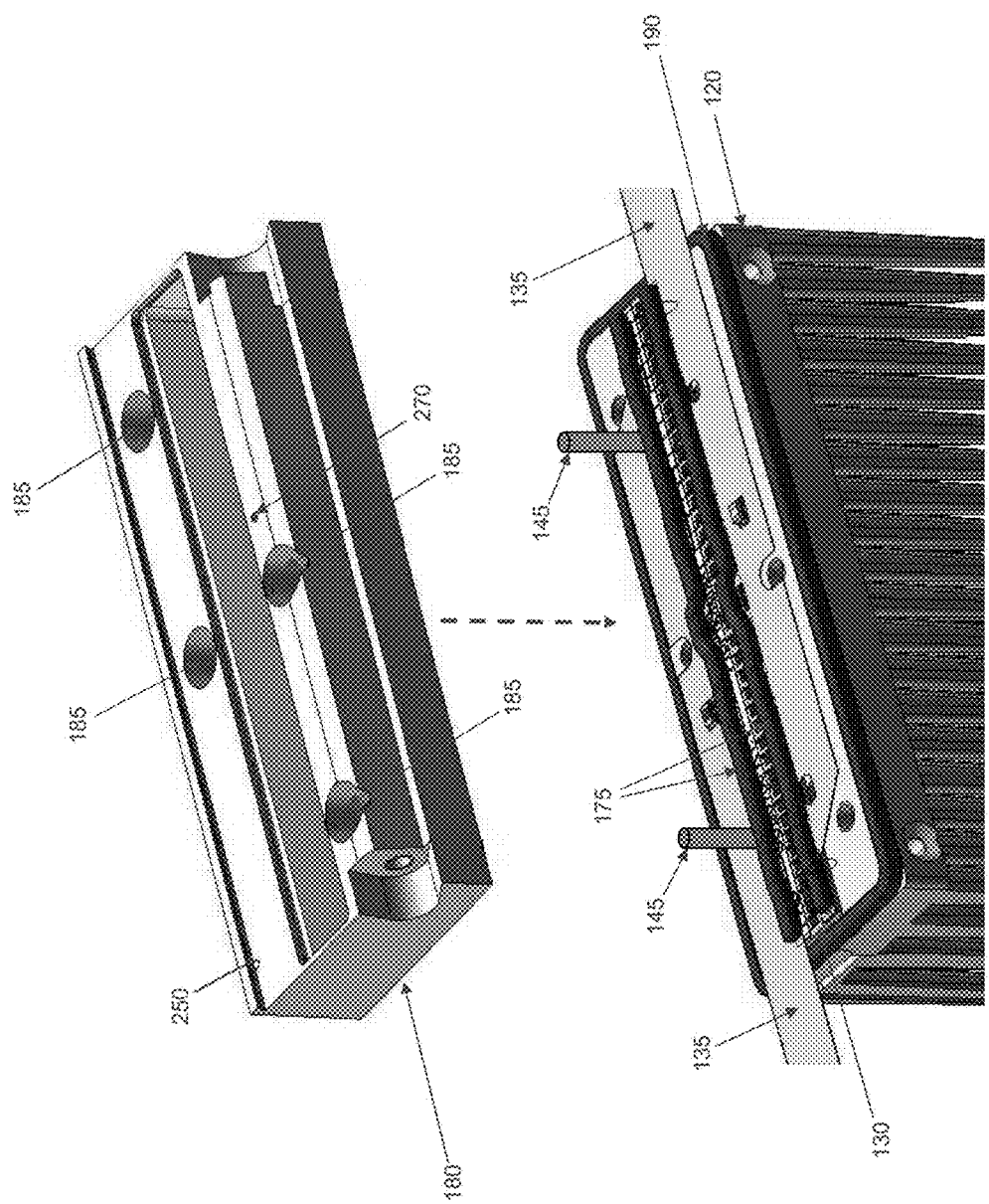
FIG. 5 is an exploded view showing how a reflector is mounted atop the construction shown in FIGS. 3 and 4.

Looking now at FIG. 5, silicone cords 175 are positioned on flexible polyimide substrates 135, covering the locations where the flexible polyimide substrates and LED substrate 130 are soldered together and where the various sensing elements (e.g., the two photodiodes 160, thermistor 165 and resistor 170) are located close to the LED substrate. The function of the two silicone cords 175 is to provide protection to the two flexible polyimide substrates 135 when a reflector 180 is mounted onto aluminum block 120 of heat sink 115. Reflector 180 is guided into its correct position on aluminum block 120 of heat sink 115 via dowel pins 145 inserted vertically into aluminum block 120 of heat sink 115.

Figure 6:
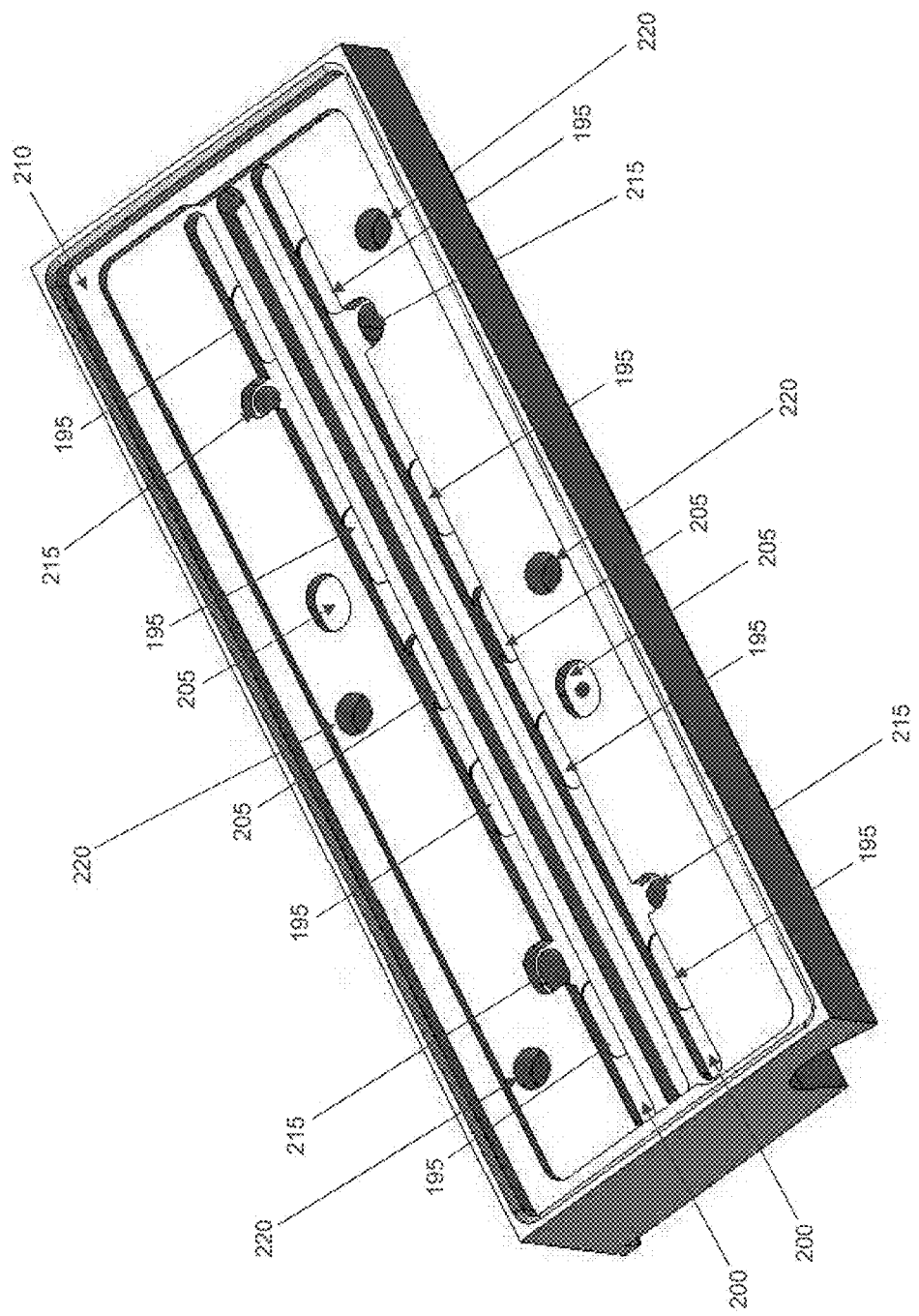
FIG. 6 is a bottom view of the reflector shown in FIG. 5.

Looking next at FIGS. 5 and 6, reflector 180 is attached directly to aluminum block 120 of heat sink 115 by four screws 185. The outer circumference of reflector 180 sits on an O-ring 190 disposed about the outer circumference of aluminum block 120 of heat sink 115. O-ring 190 is placed directly between the interfaces of reflector 180 and aluminum block 120 of heat sink 115, providing a hermetic seal to protect the non-encapsulated LEDs 140. As seen in FIG. 6, the bottom of reflector 180 comprises cutouts to accommodate the various elements carried by aluminum block 120 of heat sink 115, e.g., cutouts 195 to accommodate solder pads 150, cutouts 200 to accommodate silicone cords 175, cutouts 205 to accommodate sensors 160, 165, 170, cutout 210 to accommodate O-ring 190, blind holes 215 to accommodate dowel pins 145 on aluminum block 120 of heat sink 115, and holes 220 to accommodate screws 185 for securing window assembly 180 to aluminum block 120 of heat sink 115.

Figure 7:
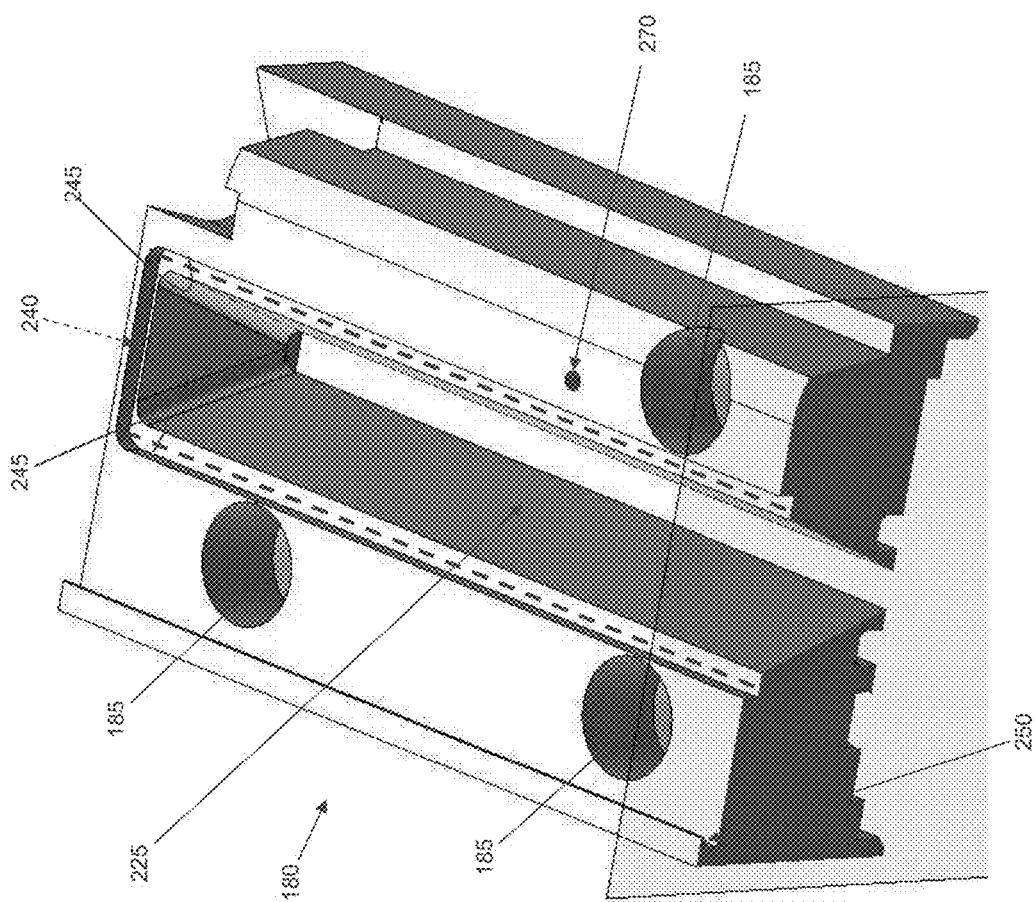
FIG. 7 is a schematic view showing details of the reflector.

Looking next at FIGS. 7-9, reflector 180 comprises a reflector chamber 225 (FIG. 7), an removable outer (exit) window 230 (FIG. 8), and a hinged clamp 235 (FIGS. 7, 8 and 9). Reflector 180 can be made out of metal (e.g., aluminum), plastic, etc. by techniques such as milling, drop forging, injection molding or die casting. The depth and angle of reflector chamber 225 will depend on the optical output required (intensity, working distance, shape, etc.). Reflector chamber 225 can be coated in chrome or other suitably reflective material to improve reflectivity. In one form of the invention, LEDs 140 are not encapsulated and are instead hermetically sealed from the environment by a fixed inner window 240. If desired, a light bar (not shown) may be placed in front of LEDs 140 at a predetermined distance to produce collimated light. It will be appreciated by those skilled in the art that other optical configurations possible.

In the construction shown in FIGS. 7, 8A, 8B and 9, reflector 180 carries two windows made of, for example, borosilicate, quartz, BK7, etc., i.e., the permanently fixed inner window 240 glued onto an inner window undercut 245 (FIG. 7), and the removable outer (exit) window 230. The permanently fixed inner window 240 allows the LED light to pass through while providing a hermetic seal to LEDs 140. The removable outer (exit) window 230 (FIGS. 8A, 8B and 9) is positioned in a window-retaining undercut 250 (FIGS. 7, 8A and 8B) and selectively held in place by hinged clamp 235.

Hinged clamp 235 effectively serves as a window securing/releasing mechanism for the removable outer (exit) window 230. Looking now at FIGS. 8A, 8B and 9, hinged clamp 235 is pivotally attached to reflector 180 by suitable fastening screws 255. Hinged clamp 235 comprises a toe portion 260 adapted to clamp removable outer (exit) window 230 to reflector 180. Hinged clamp 235 is spring-loaded and, in its natural or "resting" position, clamps tightly against removable outer (exit) window 230. Removable outer (exit) window 230 is removed from reflector 180 by pulling back hinged clamp 235 and sliding removable outer (exit) window 230 from window-retaining undercut 250 as shown in FIG. 9. A slot grip 265 (FIG. 8B) which receives an insert grip (not shown) may be provided on hinged clamp 235 to provide gripping aides for the user.

Figure 10A:
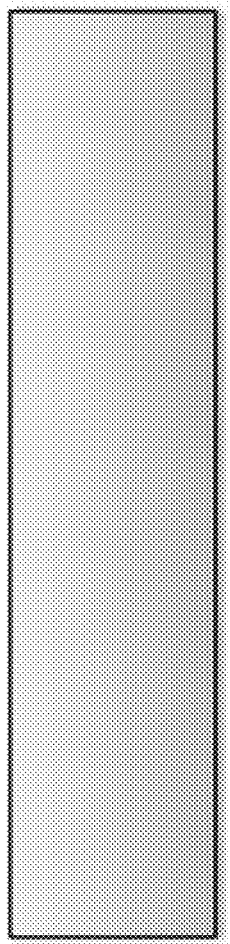
FIGS. 10A, 10B, 10C and 10D are schematic views showing an outer (exit) window with various patterns of build-up on the outer surface of the outer (exit) window.
Figure 10B:
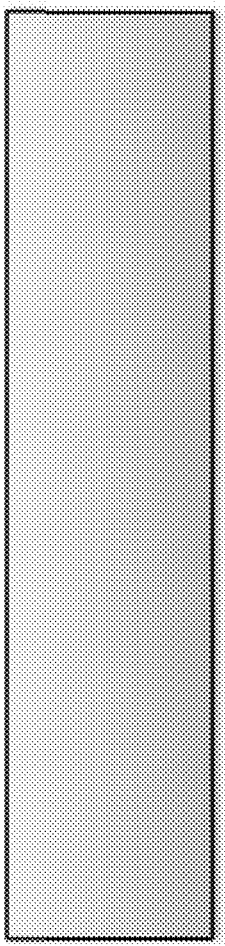
Figure 10C:
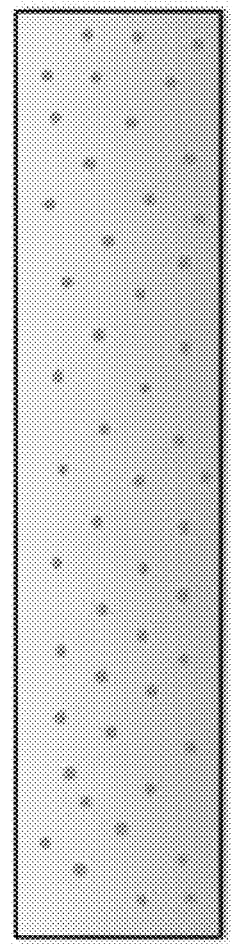
Figure 10D:
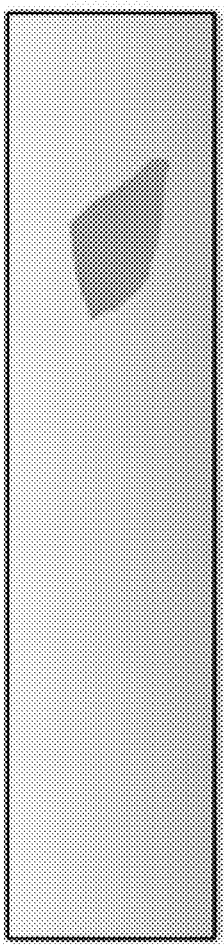

As discussed above, it is desirable to provide a sensor to detect excessive build-up of material on the surface of removable outer (exit) window 230. This is made challenging, however, due to the limited space available to position a sensor (or sensors) on LED substrate 130. Furthermore, the material building up on removable outer (exit) window 230 can have different characteristics depending on the user application. For example, a removable outer (exit) window 230 may start out clear (FIG. 10A) and, in one application, you could have a relatively uniform build-up of material across removable outer (exit) window 230 (FIG. 10B). In this case, utilizing a single photodiode to measure the change in light transmission through removable outer (exit) window 230 would be sufficient. However, it is possible to have a randomly distributed set of material spots across removable outer (exit) window 230 (FIG. 10C). In this case, it would be necessary to have numerous photodiodes to measure the change in light transmission through removable outer (exit) window 230. This is not very practical and could add significant cost to the lamp. A further issue arises if there is a build-up of material on removable outer (exit) window 230 at one particular location (FIG. 10D). A single photodiode response might not pick this up even though the build-up at one particular location could have a significant effect on the lamp's operational effectiveness. What is needed, therefore, is a novel technique that minimizes the need for multiple photodiodes and accurately measures the build-up of material on the outer surface of removable outer (exit) window 230.

In a typical LED-based system, light is produced by the LEDs. The light passes through, or interacts with, some optical elements (e.g., lenses, reflectors, etc.) and exits through an outer (exit) window. It is well known that 100% transmission of light does not occur at the outer (exit) window, inasmuch as some light is reflected back into the system.

In accordance with the present invention, it has been recognized that, in addition to a portion of the light entering outer (exit) window 230 being reflected back into the system, a portion of the light entering the outer (exit) window will be internally reflected and travel to the edge of the outer (exit) window. If material (e.g., inks, adhesives, polymers, coatings, etc.) become deposited on the outer surface of the outer (exit) window, more light will be reflected back into the outer (exit) window, and more light will be internally reflected and travel to the edge of the outer (exit) window. Therefore, where more material is deposited on the outer surface of outer (exit) window 230, more reflections will travel to the edges of the outer (exit) window.

The present invention takes advantage of this fact, by monitoring the amount of light that is reflected to an edge of the removable outer (exit) window 230 in order to determine the amount of material which has become deposited on the outer surface of the window.

Figure 11:
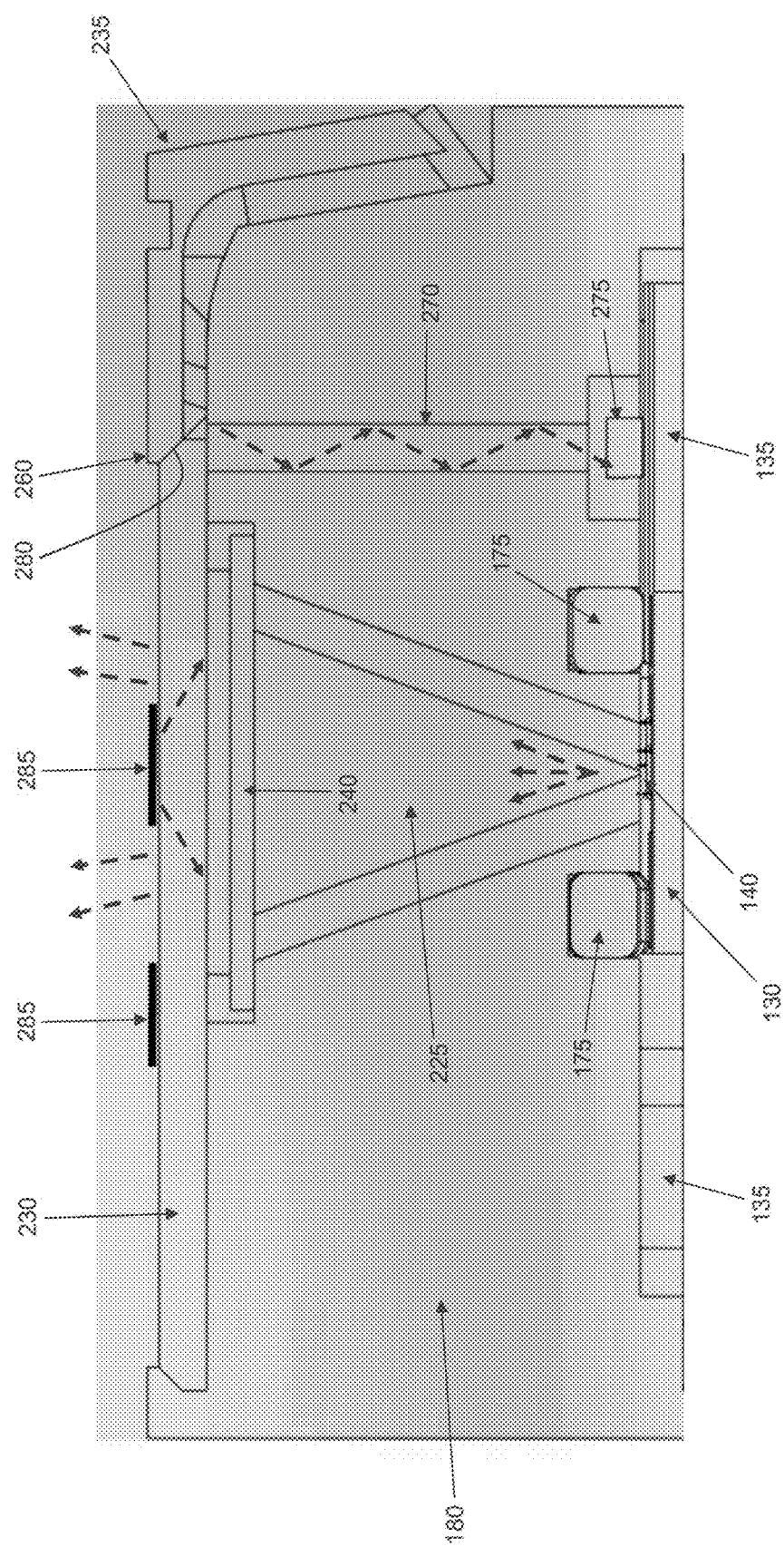
FIG. 11 is a schematic view showing how build-up on the outer surface of the outer (exit) window may be detected.

More particularly, with the present invention, and looking now at FIG. 11, the light that travels to one of the edges of removable outer (exit) window 230 is coupled into a light pipe 270 (e.g., a chrome-coated through-hole) and directed toward a photodiode 275. In this case, removable outer (exit) window 230 is chamfered at its edges so that it rests perfectly against a reflective surface 280 of hinged clamp 235. Reflective surface 280 of hinged clamp 235 acts as a mirror to reflect light from the edge of removable outer (exit) window 230 into light pipe 270. Light pipe 270 can be filled with silicone or other similar optically-transparent material to hermetically seal the LEDs. With the present invention, if removable outer (exit) window 230 is covered with a material (e.g., a contaminant 285), the internal reflections within removable outer (exit) window 230 increase, leading to an increase in the amount of light coupled into light pipe 270 and picked up by photodiode 275. The advantage of this approach is that the light entering light pipe 270 is an amalgamation of the various reflections happening at removable outer (exit) window 230 and, as such, is independent of where, and how, the material is deposited on the outer surface of removable outer (exit) window 230—in other words, the amount of light directed to photodiode 275 is not dependent on a particular build-up pattern on removable outer (exit) window 230. A threshold build-up level can be set by a user in the lamp such that, when this threshold build-up level is reached (i.e., when the output of photodiode 275 reaches a predetermined level), the user is notified that removable outer (exit) window 230 should be replaced in order to ensure that the LED lamp will still work effectively. This notification can be sent to the user via a software protocol or through the lamp itself (e.g., by flashing an indicator LED).

Figure 12B:
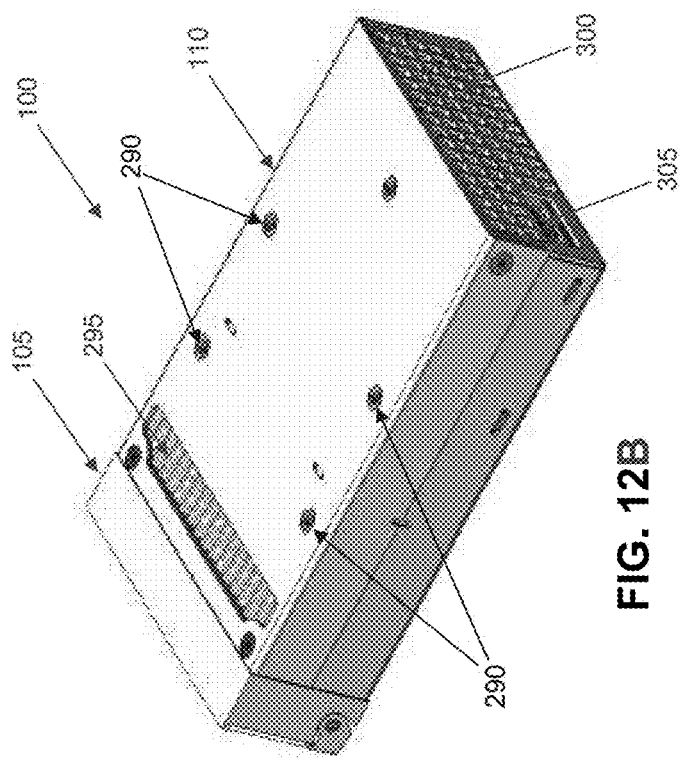
FIGS. 12A and 12B are schematic views showing further aspects of the novel LED lamp of the present invention.
Figure 12A:
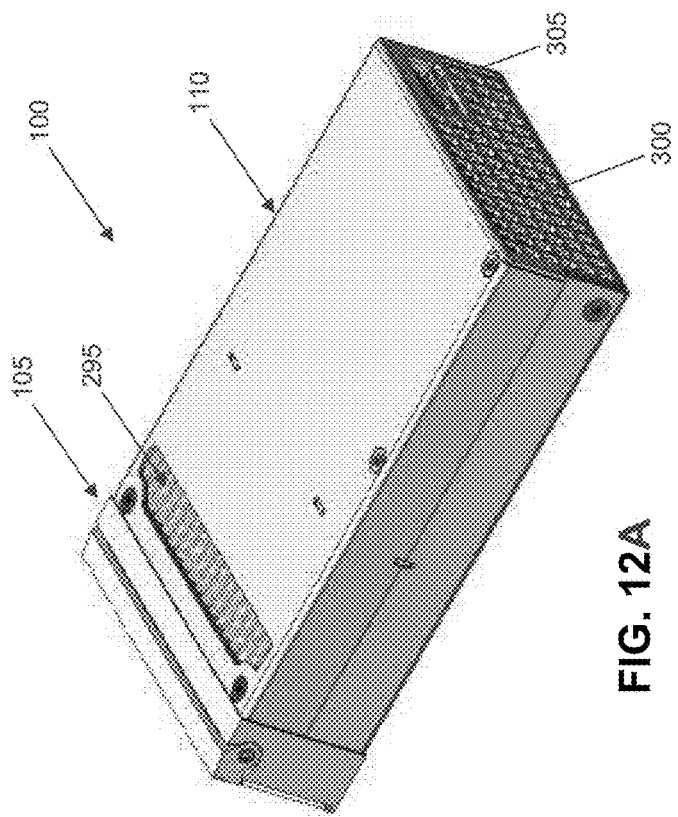

LED lamp 100 is preferably rectangular in nature but can be any shape. FIGS. 12A and 12B show an exemplary configuration for LED lamp 100. Housing section 110 can have a number of mounting holes 290 for securing LED lamp 100 to a user-provided mount. Housing section 110 preferably also has openings 295 that allow air to be exhausted from the interior of housing section 110. The rear of housing section 110 preferably comprises an open grid 300 with an opening for an electrical connector 305. Open grid 300 allows for air intake into housing section 110. Housing section 110 preferably comprises means to hold components inside housing section 110. The inside of LED lamp 100 comprises an electronic driver board (which includes the aforementioned PCB driver circuit for driving the LEDs), and one or more fans for drawing fresh air into open grid 300 and circulating the air through the interior of housing section 110 before exhausting through openings 295. To secure the fan(s) in place, the fan(s) can be mounted in a fan rack. The fan rack can be secured into the housing through a series of slots in the lamp housing. The fans can be riveted into the fan rack. The components are preferably arranged such that the electronic driver board is placed near open grid 300. The incoming air passes over the electronic driver board, cooling the PCB driver circuits by the adjacent fan(s).

Novel aspects of the present invention include, but are not limited to:
  the novel header section which comprises a removable outer (exit) window;
  placing sensors near the LED substrate while maximizing optical efficiency;
  measuring of the intensity of light at the side edges of the removable outer (exit) window to determine the amount of material built up on the outer surface of the removable outer (exit) window; and
  the hermetic sealing of LEDs (instead of conventional LED encapsulation).

Advantages of the present invention include, but are not limited to:
  an outer (exit) window which is easily replaceable;
  integration of sensing elements adjacent the LED substrate; and
  the provision of means for determining the build-up of material on the outer surface of the outer (exit) window.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A novel LED lamp comprising:
    a lamp body;
    an LED mounted to the lamp body;
    an outer (exit) window; and
    a hinged clamp for releasably mounting the outer (exit) window to the lamp body such that light emitted from the LED passes through the outer (exit) window;
    wherein the lamp body comprises a heat sink and a reflector mounted to the heat sink, wherein the LED is mounted to the heat sink, and wherein the hinged clamp is mounted to the reflector.

2. A novel LED lamp according to claim 1 further comprising a fixed inner window mounted to the reflector between the LED and the outer (exit) window.

3. A novel LED lamp according to claim 1 wherein the LED is mounted to a substrate, and further wherein the substrate is mounted to the heat sink.

4. A novel LED lamp according to claim 3 further comprising an electronic driver circuit for driving the LED, and further wherein a flexible polyimide connector is used to connect the LED to the electronic driver circuit.

5. A novel LED lamp according to claim 1 wherein the outer (exit) window comprises an edge surface, and further wherein the LED lamp comprises a photodetector and a light pipe for transmitting light from the edge surface of the outer (exit) window to the photodetector.

6. A novel method for producing light, the novel method comprising:
    providing a novel LED lamp comprising:
        a lamp body;
        an LED mounted to the lamp body;
        an outer (exit) window; and
        a hinged clamp for releasably mounting the outer (exit) window to the lamp body such that light emitted from the LED passes through the outer (exit) window;
        wherein the lamp body comprises a heat sink and a reflector mounted to the heat sink, wherein the LED is mounted to the heat sink, and wherein the hinged clamp is mounted to the reflector; and
    driving the LED so that it emits light.

7. A method according to claim 6 further comprising:
    detecting the build-up of contaminants on the outer (exit) window;
    manipulating the hinged clamp so as to release the outer (exit) window from the lamp body; and
    remounting an outer (exit) window to the lamp body.

8. A method according to claim 7 wherein the outer (exit) window comprises an edge surface, wherein the LED lamp comprises a photodetector and a light pipe for transmitting light from the edge surface of the outer (exit) window to the photodetector;
    and further wherein the photodetector and the light pipe are used to detect the build-up of contaminants on the outer (exit) window.

9. A method according to claim 6 further comprising a fixed inner window mounted to the reflector between the LED and the outer (exit) window.

10. A method according to claim 6 wherein the LED is mounted to a substrate, and further wherein the substrate is mounted to the heat sink.

11. A method according to claim 10 further comprising an electronic driver circuit for driving the LED, and further wherein a flexible polyimide connector is used to connect the LED to the electronic driver circuit.

* * * * *